United States Patent
Aktas et al.

(10) Patent No.: US 11,343,714 B2
(45) Date of Patent: May 24, 2022

(54) RADIO COMMUNICATION OF CRITICAL PACKET DATA UNITS

(71) Applicant: Telefonaktiebolaget LM Ericsson (publ), Stockholm (SE)

(72) Inventors: Ismet Aktas, Neuss (DE); Junaid Ansari, Aachen (DE); Mohammad Hossein Jafari, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 159 days.

(21) Appl. No.: 16/646,301

(22) PCT Filed: Sep. 12, 2017

(86) PCT No.: PCT/EP2017/072842
§ 371 (c)(1),
(2) Date: Mar. 11, 2020

(87) PCT Pub. No.: WO2019/052627
PCT Pub. Date: Mar. 21, 2019

(65) Prior Publication Data
US 2020/0296622 A1    Sep. 17, 2020

(51) Int. Cl.
*H04W 28/06* (2009.01)
*H04L 69/322* (2022.01)
(Continued)

(52) U.S. Cl.
CPC ........... *H04W 28/06* (2013.01); *H04L 69/322* (2013.01); *H04W 28/24* (2013.01); *H04W 80/02* (2013.01)

(58) Field of Classification Search
None
See application file for complete search history.

(56) References Cited

U.S. PATENT DOCUMENTS

2006/0048036 A1*  3/2006  Miura ................... H04L 1/0042
                                                          714/758
2011/0164507 A1*  7/2011  Jeon ...................... H04L 1/1825
                                                          370/242
(Continued)

FOREIGN PATENT DOCUMENTS

WO    2017003048 A1    1/2017

OTHER PUBLICATIONS

Ashraf, Shehzad A., et al., "Ultra-Reliable and Low-Latency Communication for Wireless Factory Automation From LTE to 5G", IEEE, 2016, pp. 1-8.
(Continued)

*Primary Examiner* — Edan Orgad
*Assistant Examiner* — Emmanuel K Maglo
(74) *Attorney, Agent, or Firm* — Christopher & Weisberg, P.A.

(57) ABSTRACT

A technique for communicating protocol data units, PDUs, in a radio communication from a transmitter (100) to a receiver (200) is described. As to a method aspect of the technique, one or more control messages indicative of Quality of Service, QoS, requirements for the radio communication are received. The QoS requirements include a control command for a reliability of the radio communication and a control command for a latency of the radio communication. A batch of redundant PDUs is transmitted from the transmitter (100) to the receiver (200). A number of the redundant PDUs per batch depends on the control command for the reliability and a temporal spread of the redundant PDUs per batch depends on the control command for the latency.

18 Claims, 11 Drawing Sheets

300

Receive one or more control messages indicative of QoS requirements for a radio communication between a transmitter and a receiver, the QoS requirements including a control command for a reliability of the radio communication and a control command for a latency of the radio communication — 302

Generate redundant PDUs by copying a data unit (e.g., an SDU) defining the content of a batch of the redundant PDUs — 304

Transmit the batch of the redundant PDUs from the transmitter to the receiver, wherein a number of the redundant PDUs per batch depends on the control command for the reliability and a temporal spread of the redundant PDUs per batch depends on the control command for the latency — 306

(51) Int. Cl.
*H04W 28/24* (2009.01)
*H04W 80/02* (2009.01)

(56) References Cited

U.S. PATENT DOCUMENTS

| | | |
|---|---|---|
| 2012/0057560 A1 | 3/2012 | Park et al. |
| 2012/0159278 A1 | 6/2012 | Jen et al. |
| 2013/0111288 A1 | 5/2013 | Sagfors et al. |
| 2015/0003242 A1* | 1/2015 | Han .................. H04L 47/24 370/230 |
| 2015/0051749 A1* | 2/2015 | Hancock ............ G06Q 50/06 700/295 |
| 2017/0214489 A1* | 7/2017 | Jiang .................. H04L 1/1819 |
| 2017/0331577 A1* | 11/2017 | Parkvall .............. H04B 7/0452 |
| 2017/0331670 A1* | 11/2017 | Parkvall .............. H04J 11/0079 |
| 2017/0366618 A1* | 12/2017 | Vrzic .................. H04L 67/148 |
| 2018/0310308 A1* | 10/2018 | Loehr ................ H04W 72/1242 |
| 2020/0145069 A1* | 5/2020 | Ferrante ............... H04B 7/10 |

OTHER PUBLICATIONS

Holfeld, Bernd, et al., "Wireless Communication for Factory Automation: An Opportunity for LTE and 5G Systems", IEEE Communications Magazine, Jun. 2016, pp. 36-43.

Aktas, Ismet, et al., "LTE Evolution—Latency and Reliability Enhancements for Wireless Industrial Automation", Ericsson Research, Germany, Oct. 8-13, 2017, pp. 1-7.

Unknown, Author, "Redundancy Schemes below PDCP Layer", 3GPP TSG-RAN2 Meeting #97; R2-1701201; Athens, Greece; Huawei, HiSilicon, Feb. 13-17, 2017, pp. 1-4.

* cited by examiner

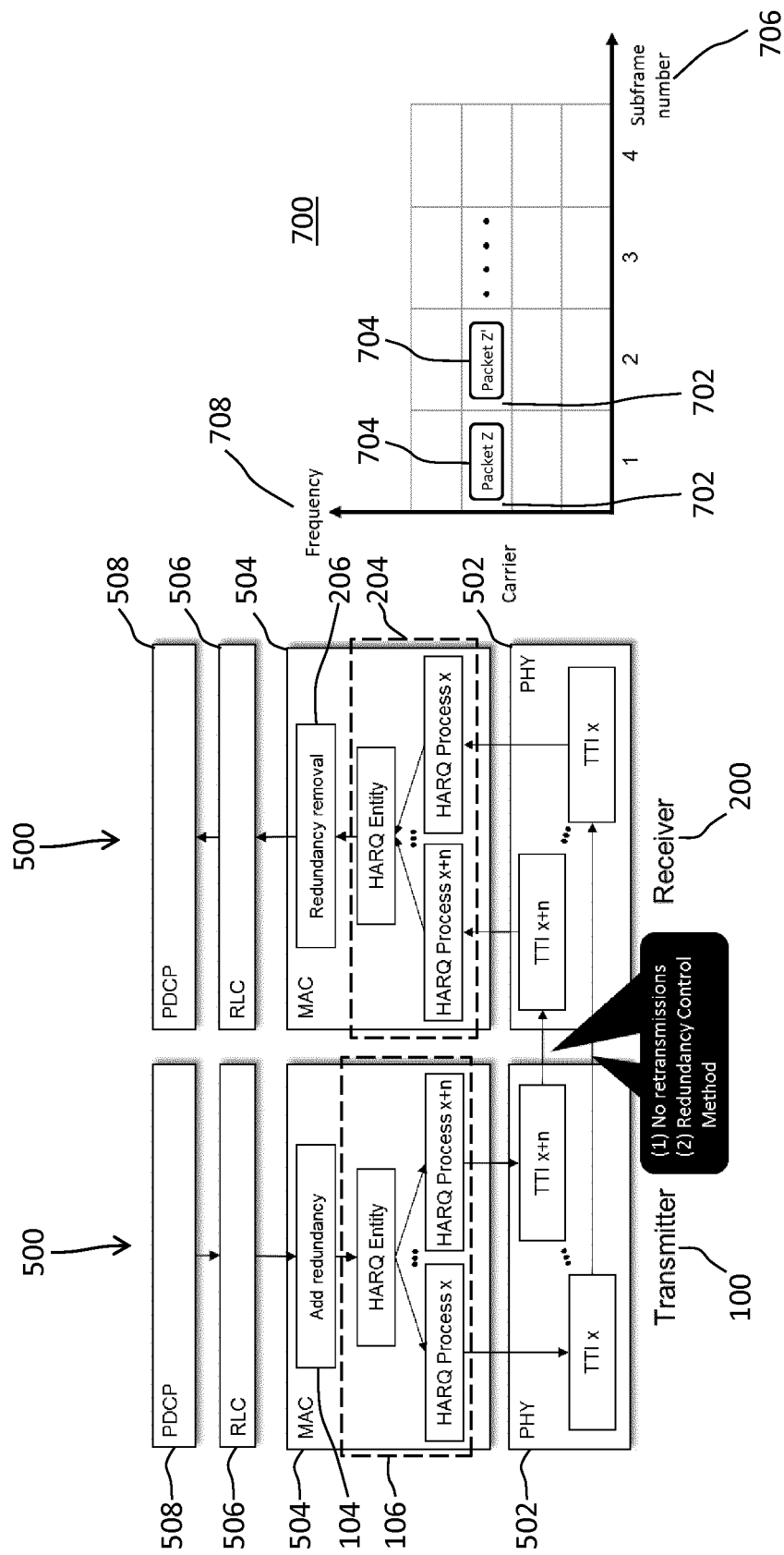

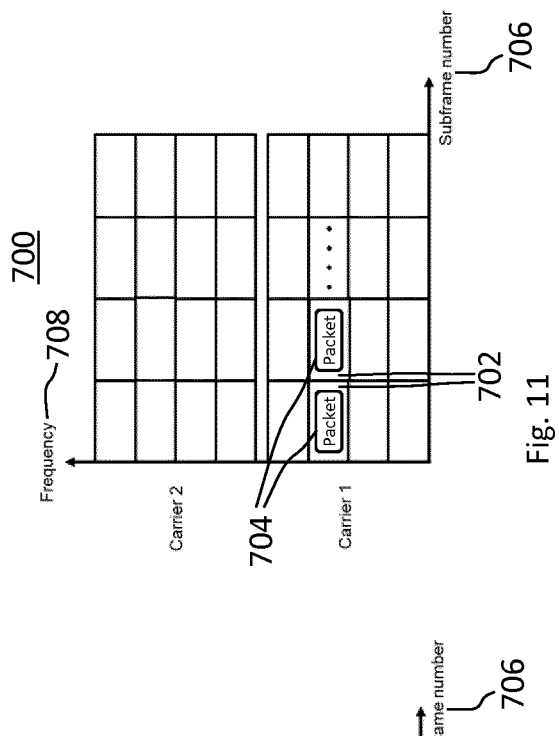
Fig. 11
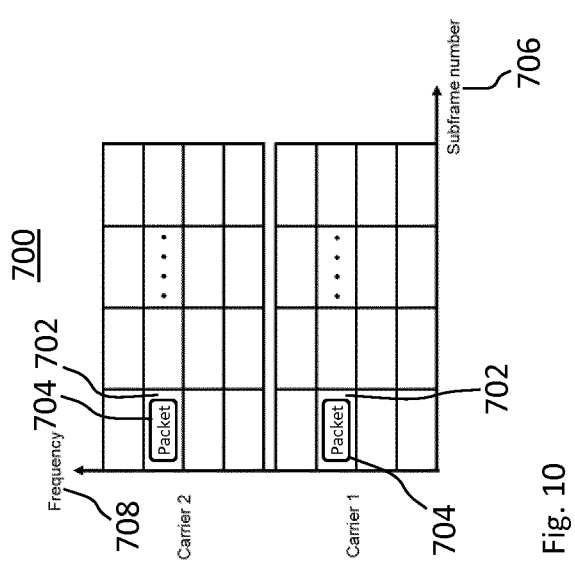
Fig. 10
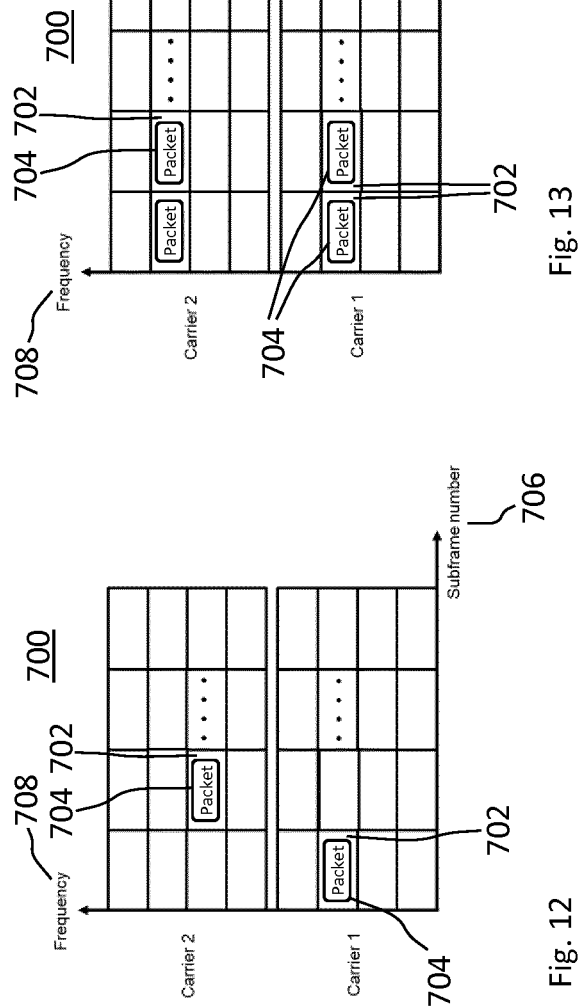
Fig. 13
Fig. 12

RADIO COMMUNICATION OF CRITICAL PACKET DATA UNITS

TECHNICAL FIELD

The present disclosure generally relates to a technique for communicating packet data units (PDUs) in a radio communication. More specifically, and without limitation, methods and devices are provided for transmitting and receiving PDUs with reliability and timeliness constraints.

BACKGROUND

A key objective of a next generation or 5G radio networks is the support of low-latency and highly reliable machine-type communication (MTC), also referred to as critical MTC (C-MTC) or ultra-reliable low-latency communication (URLLC). The URLLC or C-MTC needs to address the low latency and high reliability requirements of very different use-cases such as industrial applications, smart grids, remote control of machines and devices, etc. Diversity at the physical layer of the URLLC or C-MTC in terms of space, time and frequency as well as and their combinations provides the technical means to improve reliability.

Long Term Evolution (LTE) specified by the 3rd Generation Partnership Project (3GPP) and LTE-Advanced are examples of existing 4G radio networks. An LTE transmitter appends a 24-bit field to the transport block (TB) on the physical layer for a cyclic redundancy check (CRC) at the receiver. Thus, the CRC protects the radio communication of packets included in the TB with a residual error on the order of 10-7, provided that a negative CRC triggers retransmissions of the TB until the CRC becomes positive. In 3GPP LTE, this retransmission is implemented by a Hybrid Automatic Repeat Request (HARQ) functionality on the medium access control (MAC) layer. However, each HARQ retransmission causes a delay by scheduling and transmitting a negative acknowledgment feedback to the transmitter as well as scheduling and retransmitting the TB to the receiver. Such retransmissions are not exceptional events under realistic radio condition. In an LTE implementation, a normal block error ratio (BLER) is 2% for an in-sync condition between the transmitter and the receiver. Furthermore, the radio propagation environment in important applications such as industrial use-cases suffers from strong and varying multipath effects (e.g. due to metal surfaces in the environment causing reflections as well moving parts in the environment and workers on a shop floor, etc.) leading to more pronounced packet losses, and hence need for retransmissions, compared to office or home deployment scenarios. Hence, the price for reliability, i.e. a packet error ratio (PER) on the order of 10-7, is an unconstrained latency of the radio communication.

Therefore, existing communication systems cannot fulfill the requirements of URLLC or C-MTC use-cases, which demand both an even higher degree of reliability and less latency. Moreover, in C-MTC and URLLC use-cases, latency and reliability come hand in hand. Thus, mechanisms are needed to guarantee a certain (e.g., high) level of reliability while simultaneously fulfilling certain (e.g., low) latency bounds.

B. Holfeld et al., "Wireless Communication for Factory Automation: An Opportunity for LTE and 5G Systems", IEEE Communication Magazine, June, 2016; and S. A. Ashraf et al., "Ultra-Reliable and Low-Latency Communication for Wireless Factory Automation: From LTE to 5G", Proc. of IEEE conference on Emerging Technologies and Factory Automation, Berlin, Germany, September, 2016, point out that retransmissions increase reliability but impart latency, which is undesirable in many URLLC or C-MTC use-cases. Retransmissions at the MAC layer introduce undesired latency, since retransmissions also require a new assignment of medium access resources, which might not be instantly available. That is, each step for the retransmission is subject to the availability of resource when the need for the retransmission appears. In the case of 3GPP LTE, the retransmission itself additionally takes the duration of a transmission time interval (TTI). In URLLC or C-MTC use-cases, time is crucial and there might be no time budget available even for triggering a retransmission, which consumes time for the signaling plus the time for the later retransmission itself.

Merely introducing duplicated packets or redundantly sending multiple packets at the MAC layer does not satisfy quality of service (QoS) requirements in URLLC or C-MTC applications, since reliable transmissions have to also achieve low latency. Moreover, reconfigurable techniques are needed, which allow adapting to specific reliability as well as latency targets at runtime.

SUMMARY

Accordingly, there is a need for a technique that allows increasing reliability and reducing latency in a radio communication. More specifically, there is a need for a technique that allows controlling reliability while fulfilling latency constraints. Alternatively or in addition, there is a need for a technique that reacts to changes of communication requirements and/or current channel characteristics in an established radio communication.

As to one aspect, a method of transmitting protocol data units (PDUs) in a radio communication from a transmitter to a receiver is provided. The method comprises or triggers a step of receiving one or more control messages indicative of Quality of Service (QoS) requirements for the radio communication. The QoS requirements include a control command for a reliability of the radio communication and a control command for a latency of the radio communication. The method further comprises or triggers a step of transmitting a batch of redundant PDUs from the transmitter to the receiver (wherein transmitting a batch of redundant PDUs may also be worded as transmitting a plurality of redundant PDUs). A number of the redundant PDUs per batch depends on the control command for the reliability and a temporal spread of the redundant PDUs per batch depends on the control command for the latency (wherein a number of the redundant PDUs per batch may also be simply worded as a number of transmitted redundant PDUs).

The radio communication, particularly the reliability and/or the latency of the radio communication, may be controlled based on one or more of the control messages, e.g., according to the control commands. The controlling of at least one of the reliability and the latency may be a closed-loop or feedback control. The reliability may be the controlled quantity of the feedback control. The number of redundant PDUs may be the control quantity. More specifically, the number of the redundant PDUs may be the control quantity for controlling the reliability of the radio communication, e.g., subjected to the latency bounds indicated by the QoS requirements. Some or each of the control messages, e.g., some or each of the control commands, may function as the feedback of the feedback control.

The radio resources on which the redundant PDUs are transmitted may further depend upon the available radio resources at a given time. Among the available radio resources at a given time, a subset (also referred to as a pattern) of the radio resources used for the transmission may be dynamically determined in time, across frequency carriers, spatial streams and/or a combination thereof in fulfillment of both the number of the redundant PDUs and the temporal spread.

The control command for the latency may be referred to as latency control command. The control command for the reliability may be referred to as reliability control command. Herein, the expression "control command" may encompass any signal that is received at the transmitter and acts on the transmitting step, e.g., on the number of redundant PDUs and/or the temporal spread of the redundant PDUs.

The radio resources in the transmitting step available for or used by the redundant PDUs of the batch are collectively referred to as a pattern of the radio resources.

The number of the redundant PDUs (i.e., how many PDUs are mutually redundant, e.g., in the sense of a numerical value) may also be referred to as a degree of redundancy or a size of the pattern. The QoS requirements, particularly the reliability requirement, may determine or control the number of the redundant PDUs to be transmitted in the radio communication from the transmitter to the receiver, e.g., in conjunction with the channel state. The number of the redundant PDUs (i.e., the number of redundant PDUs in one batch) may be the maximum number of mutually redundant PDUs transmitted by the transmitter. In other words, the transmitted PDUs may be grouped in batches based on their mutual redundancy.

The temporal spread of the redundant PDUs (i.e., the temporal spread of the batch including the redundant PDUs according to the number of the redundant PDUs) may also be referred to as a temporal extent of the redundant transmission or temporal extent of the batch or the pattern. The temporal spread may be the duration of the batch including the different radio resources carrying the redundant PDUs. The redundant PDUs in one batch may be transmitted simultaneously and/or consecutively. The temporal spread may be a (e.g., minimum) time interval encompassing all the radio resources on which the redundant PDUs (e.g., the PDUs of one batch) are transmitted.

The reliability may be measured (e.g., by the receiver), indicated and/or represented (e.g., in one or more of the control messages, particularly in the reliability control command) in terms of a bit-error rate or bit-error ratio (BER) or a packet-error rate or a packet-error rate or packet-error ratio (PER). Herein, "packet" may refer to a PDU. The latency may be measured (e.g., by the receiver), indicated and/or represented (e.g., in one or more of the control messages, particularly in the latency control command) in terms of a time unit, e.g., millisecond (ms), subframes and/or a transmission time interval (TTI).

One or more of the control messages may be indicative of absolute and/or relative QoS requirements. For example, the QoS requirements may include a transmitter configuration such as one or more values or limits of (at least some of) the QoS requirements. For example, one or more of the control messages may be indicative of the QoS requirements in that the latency control command and/or the reliability control command is indicative of a value or a limit of the latency and/or a value or a limit of the reliability. Optionally, one or more of the control messages (e.g., an acknowledgment feedback or a dedicated message) may be indicative of the number of redundant PDUs per batch.

Alternatively or in addition, the indication of the QoS requirements may be indicative of maintaining and/or a change of (at least some of) the QoS requirements. For example, one or more of the control messages may be indicative of the QoS requirements in that the latency control command and/or reliability control command is indicative of maintaining or a change of the latency and/or the reliability. The reliability control command may include at least one of an indicator for maintaining the number of redundant PDUs, an indicator for increasing the number of redundant PDUs, an indicator for decreasing the number of redundant PDUs, an indicator of a step size for increasing or decreasing the number of redundant PDUs and a value for the number of redundant PDUs.

The transmitter may transmit the redundant PDUs en bloc, i.e., in one batch. Further PDUs may be transmitted in further batches. The method may be repeated for each batch. The number of the redundant PDUs and/or the temporal spread of the redundant PDUs may be updated, e.g., from batch to batch. The feedback control may take one or more of the control messages, e.g., the latest of the control messages, into account for the next batch. The control message functioning as the feedback may be received between consecutive batches.

The radio communication may be an ultra-reliable low-latency (URLLC) communication, a critical machine-type communication (C-MTC) or massive machine-type communication (M-MTC). For the purpose of the technique, e.g., in different embodiments, the expressions URLLC, C-MTC and M-MTC may be used interchangeably. The transmitter and/or the receiver may include or may be connected to at least one of a manufacturing device, an actuator, a sensor and a controller (e.g., a programmable logic controller, PLC).

The redundant PDUs may have equal content (e.g., a data payload or a Service Data Unit, SDU, carried by each of the PDUs). Optionally, the same content may be channel coded for the transmission using different redundancy versions. Alternatively or in addition, headers (e.g., one or more header fields) of the redundant PDUs may be different. Alternatively, the redundant PDUs may be exact same copies. The receiver may detect a redundant PDU (i.e., detect that a PDU is redundant, e.g., identical, to an earlier received PDU) by comparing a Radio Link Control (RLC) sequence numbers. The RLC sequence numbers may be compared at a Medium Access Control (MAC) layer of the receiver. Only one of the redundant PDUs may be forwarded to the RLC layer.

The transmitter may be a source of traffic. The receiver may be a destination of the traffic. The redundant PDUs may carry redundant (e.g., identical) portions of the traffic. The one or more control messages may be indicative of QoS requirements of the traffic in the radio communication. One or more of the control messages may be indicative of a QoS Class Identifier (QCI) and/or a type of a bearer used by the radio communication. The bearer may include a radio bearer and/or a dedicated bearer, e.g., for an Evolved Packet System (EPS) bearer.

The one or more control messages indicative of the QoS requirements for the radio communication may include one or more first control messages including or indicative of the reliability control command for the radio communication. Alternatively or in addition, the one or more control messages indicative of the QoS requirements for the radio communication may include one or more second control messages including or indicative of the latency control command for the radio communication.

At least one of the number of the redundant PDUs per batch and the temporal spread of the redundant PDUs may further depend on a channel state (e.g., channel conditions) of a channel used for the radio communication from the transmitter to the receiver. In a first variant, the transmitter may take into account the current channel conditions for determining the number and/or the temporal spread, wherein the determined number and/or the determined temporal spread are included in the control message. In a second variant, which is combinable with the first variant, the receiver takes into account the current channel conditions for determining the number and/or the temporal spread. In a third variant, which is combinable with the first and/or the second variant, the number and/or the temporal spread may indirectly depend on the channel conditions as a result of the control messages (e.g., a number or proportion of NACKs) functioning as the feedback of the feedback control.

At least one of the number and the temporal spread may be initialized based on a predefined channel state. Alternatively or in addition, the technique may reconfigure at least one of the number and the temporal spread at runtime, e.g., to a reliability requirement and/or a latency requirement.

The channel state used for determining at least one of the number and the temporal spread may be updated over time, e.g., by measuring reference signals transmitted from the receiver to the transmitter or based on Channel State Information (CSI), particularly a Channel Quality Indicator (CQI) or Signal-to-Noise Ratio (SNR), reported from the receiver to the transmitter. Accordingly, the number (i.e., the introduced redundancy) may be updated over time or configured to meet the QoS requirements (e.g., the reliability requirement and/or the latency requirement).

The initialization and/or the updating of at least one of the number of PDUs per batch and the temporal spread of the batch may be determined using a look-up table, an analytical expression and/or implementation-specific values based on the channel state. The predefined channel state may determine how much redundancy is needed to suffice the QoS requirements. The QoS requirements may vary.

The reliability control command may include a reliability requirement for the reliability of the radio communication. The number of the redundant PDUs per batch may depend on the reliability requirement. Alternatively or in addition, the latency control command may include a latency requirement for the latency of the radio communication. The temporal spread of the redundant PDUs per batch depends on the latency requirement.

The reliability requirement may include a reliability limit, e.g., a maximum BER or a maximum PER. The latency requirement may include a latency limit, e.g., a maximum duration for the transmitting (and, optionally, processing) of the PDU from the transmitter to the receiver, e.g., for successfully transmitting at least one of the redundant PDUs from the transmitter to the receiver.

Side conditions of the feedback control for controlling the reliability may include the latency requirement according to the one or more control messages and/or a channel state of a channel used for the radio communication.

The QoS requirements, particularly the latency requirement, may determine the temporal spread of the redundant PDUs in the radio communication from the transmitter to the receiver. The temporal spread of the redundant PDUs may be strictly less than the latency requirement.

At least one of the control messages may be indicative of a device capability of the receiver or a device category of the receiver. The device capability or the device category may imply one or each of the QoS requirements or any of the further constraints. For example, the device capability may imply an upper limit on the number of spatial streams and/or frequency carriers for the redundancy. Alternatively or in addition, the at least one control message may be indicative of a service category. The service category may imply the QoS requirements or may further specify the QoS requirements. The device capability, the device category and/or the service category may include at least one of the URLLC, the C-MTC and the M-MTC. For example, the reliability requirement and/or the latency requirement may be more restrictive for C-MTC than for M-MTC.

At least one of the one or more control messages may be indicative of at least one of a network configuration and a network capability. At least one of the number of the redundant PDUs per batch and the temporal spread of the redundant PDUs per batch may further depend on at least one of the network configuration and the network capability.

The network configuration and/or the network capability may include a lower limit on the latency for the radio communication. Alternatively or in addition, the network configuration or the network capability may include an amount of available and/or utilizable radio resources, which may imply an upper limit on the number of the redundant PDUs. The network configuration or the network capability may also be referred to as network policy constraints. At least one of the transmitter and the receiver may be part of a radio access network (RAN).

At least one of the one or more control messages may be received from the receiver. The at least one control message from the receiver may function as the feedback of the feedback control.

The transmitter may be in radio communication with multiple receivers. Each of the receivers may provide at least one of the control messages. At least one of the number of the redundant PDUs per batch and the temporal spread of the redundant PDUs per batch may depend on the control messages received from the multiple receivers. At least one of the number of the redundant PDUs and the temporal spread of the redundant PDUs transmitted to one of the multiple receivers may depend on the number of the multiple receivers and/or the QoS requirements of all of the multiple receivers in radio communication with the transmitter.

At least one of the one or more control messages may include a configuration message received upon setting up the radio communication. The control message may be received according to a communication protocol for setup, configuration or reconfiguration of the radio communication. The control message may be part of a negotiation protocol of the radio communication.

The configuration message may be indicative of the latency requirement. The latency requirement defined by the configuration message may be persistent for the radio communication. Another control message may be indicative of the reliability requirement. The reliability requirement may be changed by receiving further control messages during the radio communication.

The number of the redundant PDUs per batch may be maintained in the absence of an acknowledgment feedback from the receiver in the one or more control messages.

Each of the redundant PDUs in the batch may be transmitted independent of and/or prior to receiving an acknowledgment feedback from the receiver for any one of the redundant PDUs in the batch. In this context, the PDU transmission and the acknowledgment feedback may relate to the same batch of redundant PDUs. All PDUs that are mutually redundant (i.e., the PDUs in one of the batches) may be transmitted independent of and/or prior to the reception of any acknowledgment feedback that relates to one or all of these redundant PDUs, i.e., to any one of the PDUs in the same batch.

The redundant PDUs may be transmitted without (e.g., explicitly) waiting for an acknowledgment feedback for the transmitted data (e.g., the data transmitted in each of the redundant PDUs). For example, the redundant PDUs may be transmitted solely based on the QoS requirements received prior to the transmission of all of the redundant PDUs and/or based on the channel state. The channel state may also be referred to as a channel quality or channel conditions. If the redundant PDUs are transmitted using different frequency carriers, the channel quality may comprise the quality or conditions of the different channels used for the transmission. The channel quality or conditions of one of the frequency carriers may be different from the other one of the frequency carriers.

At least one of the one or more control messages may include an acknowledgment feedback received from the receiver in response to at least one earlier PDU transmitted from the transmitter to the receiver prior to the transmission of the redundant PDUs in the batch. The acknowledgment feedback may include a positive acknowledgment, ACK, or a negative acknowledgment, NACK. The acknowledgment feedback may function as the feedback of the feedback control.

The transmission of the at least one earlier PDU and the acknowledgment feedback may relate to different batches. The reliability may be controlled based on the acknowledgment feedback. The reliability requirement may be defined or changed according to the received acknowledgment feedback, e.g., during the ongoing radio communication.

The at least one earlier PDU may be referred to as the at least one first PDU. A number of the at least one earlier PDU may also be referred to as a first number, i.e., the first number of the one or more first PDUs.

The redundant PDUs (i.e., the redundant PDUs transmitted, after receiving the one or more control messages, in the transmitting step of above general method aspect) may be referred to as redundant second PDUs or, briefly, as the second PDUs (e.g., as opposed to the at least one earlier PDU received prior to receiving the at least one configuration message). The number of the redundant second PDUs may also be referred to as a second number, i.e., as the second number of the redundant second PDUs.

A content of the at least one earlier PDU may be different from a content of the redundant PDUs in the batch. Each of the least one first PDU (i.e. the at least one earlier PDU) may be independent of, different from and/or not redundant to each of the redundant second PDUs.

This mode of the radio communication, i.e., the transmission of one or more batches, each comprising redundant PDUs, may be referred to as a second mode, e.g., as opposed to a first mode of the radio communication that is backward compatible with a conventional specification of the acknowledgment feedback. In the first mode, a retransmission (e.g., of an individual PDU) may be selectively triggered depending on the acknowledgment feedback.

Moreover, the at least one first PDU may also include at least two redundant first PDUs. The at least two redundant first PDUs may define a first batch. The batch of the redundant second PDUs may be referred to as the second batch. For example, the transmitter may transmit multiple batches of redundant PDUs, e.g., consecutively. The PDUs in each of the batches may be mutually redundant within the same batch. Each PDU in one of the batches may be independent of, different from, and/or not redundant to any one of the PDUs in another one of the batches transmitted from the transmitter.

The QoS requirements may be controlled per batch by the acknowledgment feedback. Particularly, the acknowledgment feedback may control the number of redundant PDUs per batch. The at least one earlier PDU may be transmitted in an earlier batch including an earlier number of redundant earlier PDUs. The earlier number of redundant PDUs per batch may be changed to the number of redundant PDUs per batch based on the acknowledgment feedback. That is, the first number may be changed to the second number based on the acknowledgment feedback received in response to transmitting the first PDUs.

Each of the at least two redundant second PDUs may be different (e.g., in terms of content or payload data) from each of the at least two redundant first PDUs (i.e., the each of the earlier redundant PDUs).

By changing the redundancy (e.g., by changing the first number to the second number) during the radio communication depending on the acknowledgment feedback, the redundancy may be adjusted or configured to meet a reliability requirement for the radio communication and/or avoid wasting radio resource by transmitting with more redundancy than is necessary to achieve the required reliability.

The required reliability may be implied by the acknowledgment feedback and/or the change of the redundancy. By redundantly transmitting the PDUs according to the changed redundancy, retransmissions can be avoided. Both high reliability and low latency can be achievable.

For clarity, it is pointed out that the (e.g., earlier) "number" of redundant (e.g., earlier) PDUs in the context of a dependency of the (e.g., earlier) number or in the context of changing the (e.g., earlier) number may refer to the (e.g., earlier) "number" in the sense of how many (e.g., earlier) redundant PDUs there are, e.g., a numerical value. When referring to the (e.g., earlier) "number" of redundant (e.g., earlier) PDUs in the context of transmitting the (e.g., earlier) number of redundant (e.g., earlier) PDUs or in the context of a content of the (e.g., earlier) number of redundant (e.g., earlier) PDUs, the (e.g., earlier) "number" of redundant (e.g., earlier) PDUs may refer to a corresponding plurality of PDUs, that is the corresponding batch of PDUs.

Preferably, receiving the acknowledgment feedback does not trigger a retransmission of any one of the at least one earlier PDU. Preferably, receiving the acknowledgment feedback does not trigger a retransmission of any one of the first PDUs or the second PDUs. For example, receiving the acknowledgment feedback does not trigger a retransmission, even if the acknowledgment feedback is indicative of a negative acknowledgment. For example, none of the transmitted redundant PDUs in the batch is a retransmission of any one of the earlier PDUs or any PDU in the earlier batch.

Controlling or changing the number of redundant PDUs per batch depending on the acknowledgment feedback may include at least one of: maintaining the earlier number as the number of redundant PDUs per batch responsive to a single positive acknowledgment feedback for the earlier batch; decreasing the earlier number as the number of redundant PDUs per batch responsive to multiple positive acknowledgment feedbacks for the earlier batch; and increasing the earlier number as the number of redundant PDUs per batch responsive to one or multiple negative acknowledgment feedbacks for the earlier batch. By way of example, the number of redundant PDUs per batch may be maintained if the single positive acknowledgment feedback and one or more negative acknowledgment feedbacks are received for the earlier batch. The number of redundant PDUs per batch may be increased in the absence of a positive acknowledgment feedback for the earlier batch if at least one negative acknowledgment feedback is received for the earlier batch.

Furthermore, a step size for increasing or decreasing the number of redundant PDUs per batch may depend on a number of the negative or positive acknowledgment feedbacks.

While the acknowledgment feedback may control or change the number of redundant PDUs per batch feature, the redundant PDUs may be distributed differently (e.g., in time, space and/or frequency). Independent of the redundancy controlled by the number of redundant PDUs per batch, a trade-off between the distribution of the redundant PDUs per batch in time, on the one hand, and frequency and/or space, on the other hand, may be controlled by at least one of the network load, the device capability and the latency requirement. For example, the distribution in time, i.e., the temporal extent of the pattern, may be controlled or limited by the latency requirement.

The number of redundant PDUs per batch may be initialized prior to receiving the acknowledgment feedback and/or updated based on the received acknowledgment feedback. The number of redundant PDUs per batch, e.g., the first number, may be initialized by a predefined number, e.g., based on a predefined redundancy requirement and/or the predefined channel state.

A functional dependency (e.g., for the initialization and/or the updating) between the redundancy requirement and/or the predefined channel state (as an input) and the determined number (as an output) may be implemented by at least one of lookup tables, numerical computations using equations and machine learning. The input may further comprise at least one of the latency requirement, the device capability and the availability of the radio resources. Alternatively or in addition, the output may further comprise the pattern of the PDUs, i.e., the functional dependency may further determine the way the redundant PDUs are transmitted in time, frequency and/or space.

The predefined number and/or the first number may fulfill the reliability requirement for the predefined channel state. The predefined channel state may be a predefined worst case of the channel state or a predefined lower bound of the channel state of the channel between the transmitter and the receiver. Alternatively or in addition, the number of PDUs per batch or the redundancy requirement may be initialized based on the configuration message, a negotiation between the transmitter and the receiver and/or during setting up the radio communication between the transmitter and the receiver.

The predefined number of PDUs per batch may include a margin to ensure that a reliability requirement (e.g., a predefined or configured reliability requirement) is fulfilled. Alternatively or in combination, the first number may be determined so that the reliability requirement is certainly fulfilled or over-fulfilled. This initialization of the first number of redundant first PDUs may be referred to as an "aggressive" approach. For transmitting the first number of redundant first PDUs, the corresponding radio resources of the redundant first PDUs may be distributed over frequency and time.

Starting from the initialized number of redundant PDUs per batch, the number of PDUs per batch may be changed over time (e.g., reduced to be less resource consuming) according to the QoS requirements indicated by the one or more control messages. For example, the first number may be reduced to the second number based on the reliability requirement of the acknowledgment feedback.

The method may further comprise or trigger a step of switching between a first mode of the radio communication and a second mode of the radio communication. A retransmission may be (e.g., selectively) enabled in the first mode. In the first mode, previously transmitted data is retransmitted depending on the acknowledgment feedback received in response to the previously transmitted data.

The retransmission may be (e.g., permanently) disabled in the second mode. In the second mode the redundant PDUs in each batch includes new data that is transmitted from the transmitter to the receiver. The number of the redundant PDUs per batch depends on the reliability control command. The temporal spread of the redundant PDUs per batch depends on the latency control command.

The retransmission in the first mode may relate to a transmission of one or more PDUs that are redundant to one or more previously transmitted PDUs for which the acknowledgment feedback has been received. That is, PDUs transmitted from the transmitter prior to and after the reception of the acknowledgment feedback may be redundant in the first mode.

The transmission in the second mode may relate to a transmission of one or more PDUs that carry new data independent of previously transmitted PDUs based on which the acknowledgment feedback has been received. That is, PDUs transmitted from the transmitter prior to and after the reception of the acknowledgment feedback may be not redundant, while different PDUs transmitted after the reception of the acknowledgment feedback may redundant in the second mode.

In the first mode, transmissions of PDUs for the radio communication may use no redundancy or a constant redundancy on the level of PDUs (e.g., the number of redundant PDUs is not changed). In the second mode, the reception of the acknowledgment feedback does not trigger a retransmission of one or more of the at least one first PDUs, e.g., if the acknowledgment feedback is indicative of a negative acknowledgment.

The acknowledgment feedback (e.g., in the first mode and/or the second mode) may be implemented by or included in (e.g., a bit field of) an RLC status report (e.g., a status PDU or control PDU) and/or control information at the MAC layer. In the first mode, a negative acknowledgment (NACK) in the acknowledgment feedback may be interpreted as an Automatic Repeat Request (ARQ) at the RLC layer or as a Hybrid ARQ (HARQ) at the MAC layer. In the second mode, a NACK in the acknowledgment feedback may be interpreted as the control message indicative of the QoS, e.g., defining or changing the number of redundant PDUs.

For example, the bit field corresponding to the HARQ feedback may represent the acknowledgment feedback. In the first mode, the bit field may be interpreted as a request or trigger for the retransmission. In the second mode, the bit field may be interpreted differently for changing the redundancy, e.g., the number of redundant PDUs.

The technique may be implemented using the MAC layer, e.g., using the HARQ ACK, for the acknowledgment feedback (e.g., in the second mode). A conventional HARQ retransmissions may be disabled (e.g., in the second mode). The RLC layer may provide a fallback mechanism that allows receiving (e.g., by triggering a retransmission by sending a NACK) the missing data (e.g., if the entire batch is not received). Alternatively or in addition, RLC ACKs may serve as the acknowledgment feedback controlling the reliability or the redundancy (i.e., the number of redundant PDUs) may also be exploited.

The redundant PDUs in the batch may be transmitted on radio resources that are different from each other in at least one of time, space and frequency. The radio resource may be different in space by using different spatial streams, e.g., generated by precoding antenna signals for a plurality of antenna elements of an antenna array. The different spatial streams may correspond to different directions of a main lobe of the transmission power used for the transmitting of the redundant PDUs.

The redundancy may be introduced at the RLC layer, the MAC layer or in between the RLC and MAC layers. The redundant PDUs may be introduced in a protocol stack of the radio communication at or above the MAC layer of the protocol stack. By implementing the redundant PDUs on a MAC layer of the transmitter, the MAC layer of the receiver may be enabled to determine which redundant PDUs belong to the same batch, e.g., based on the RLC sequence number. Alternatively or in addition, the MAC layer of the transmitter may be configured to adequately distribute the redundant PDUs to the respective HARQ processes and/or HARQ entities for distribution in time, space and/or frequency according to the QoS requirements, i.e., in the pattern that fulfills the QoS requirements.

The redundant PDUs may be copied PDUs. Herein, the expression "copied PDUs" may relate to PDUs that are mutually equivalent PDUs, e.g., identical PDUs. The copied PDUs may include an original PDU used for generating the redundant PDUs by copying the original PDU. The method may further comprise or trigger a step of generating the redundant PDUs per batch by copying a data unit (e.g., a PDU or an SDU) defining the content of the batch. The redundant PDUs may be generated by copying (e.g., duplicating or multiplicating) the data unit including or representing the content of the batch. The PDUs may be copied at the RLC layer, the MAC, layer or in between the RLC and MAC layers. The redundancy may be introduced by copying a PDU (e.g., at the output of a layer, e.g., the RLC layer of the protocol stack) or by copying a Service Data Unit, SDU (e.g., at the input of a layer of the protocol stack, e.g., the MAC layer).

The copied PDUs may be equivalent in that they include the same content or payload data. Alternatively or in addition, the receiver may identify the copied PDUs as belonging to the same batch based on identical RLC sequence numbers or identical Packet Data Convergence Protocol (PDCP) sequence numbers in the copied PDUs.

At least two of the redundant PDUs per batch may be distributed in time by assigning the at least two redundant PDUs to consecutive HARQ processes. Alternatively or in addition, at least two of the redundant PDUs per batch are distributed in time by assigning the at least two redundant PDUs to the same HARQ entity. Alternatively or in addition, at least two of the redundant PDUs are distributed in time by transmitting the at least two redundant PDUs in different subframes.

Furthermore, at least two of the redundant PDUs may be distributed in at least one of space and frequency by assigning the at least two redundant PDUs to different HARQ entities. At least two of the redundant PDUs may be distributed in space by transmitting the at least two redundant PDUs on different spatial streams. At least two of the redundant PDUs may be distributed in frequency by transmitting the at least two redundant PDUs on different carrier frequencies.

As to another aspect, a method of receiving protocol data units (PDUs) in a radio communication from a transmitter at a receiver is provided. The method comprises or triggers a step of transmitting, to the transmitter, one or more control messages indicative of Quality of Service (QoS) requirements for the radio communication. The QoS requirements including a control command for a reliability of the radio communication and a control command for a latency of the radio communication. The method further comprises or triggers a step of receiving a batch of redundant PDUs from the transmitter. A number of the redundant PDUs per batch depends on the control command for the reliability. A temporal spread of the redundant PDUs per batch depends on the control command for the latency.

Herein, the receiving of the batch including the number of redundant PDUs may imply that the receiver is able to receive a radio signal at radio resources corresponding to each of the redundant PDUs. It is not necessary that the receiver successfully receives (e.g., successfully demodulates and/or decodes) each of the redundant PDUs in the batch. For example, a cyclic redundancy check (CRC) may indicate an error for one or more of the redundant PDUs. For a successful reception of the content represented by the batch, the successful reception of one of the redundant PDUs in the batch may be sufficient (e.g., due to the redundancy of the redundant PDUs in the batch).

The method may further comprise or trigger a step of removing redundant PDUs from the batch based on identical sequence numbers included in the redundant PDUs. For example, the receiver may forward a first successfully received PDU out of the redundant PDUs of the batch, e.g., to a higher layer of the protocol stack at the receiver. Further redundant PDUs of the same batch, e.g., those PDUs of the batch received and/or processed after the first successfully received PDU, may be discarded.

The acknowledgment feedback may be transmitted to the receiver for each of the redundant PDUs in the batch, e.g. independent of whether the corresponding PDU is forwarded or discarded at the receiver. The acknowledgment feedbacks may be indicative for each of the redundant PDUs whether or not the corresponding PDU has been successfully received (e.g., based on a positive or negative CRC).

The method may further comprise or trigger any step or may further comprise any feature disclosed in the context of the one method aspect for the transmitter, or a corresponding step or a corresponding feature for the receiver.

In any aspect, the technique can be implemented to control packet redundancy for regulating reliability and latency, e.g., of a C-MTCs, in industrial automation and/or URLLCs. The technique can be implemented by enhancing an ARQ mechanism or HARQ mechanism to avoid or reduce retransmissions.

The technique can configure and/or control the radio communication. The technique can improve reliability, e.g., at a fixed latency. The technique is implementable at layers of a protocol stack higher than the physical layer such as the MAC layer and/or the RLC layer. Retransmissions at the MAC layer and/or the RLC layer can be avoided or reduced in a controlled and configurable manner.

The redundant PDUs may be the result of copying the content common to all of the redundant PDUs at any point upstream of the occurrence of the redundant PDUs. At the transmitter, the redundant packets may be generated at the MAC layer or between MAC and RLC layers. Moreover, the redundant packets may be transmitted through consecutive HARQ processes, without retransmissions triggered by an acknowledgment feedback. Alternatively or in combination, the redundant packets may be transmitted though different HARQ entities, without acknowledgment feedback-triggered retransmissions.

At the receiver, the redundancies may be filtered at the MAC layer. The filter may eliminate multiple successful arrivals of the redundant packets. The receiver may control the number of redundant copies by transmitting the one or more control messages according to the transmitting step of the receiving method as the feedback of the control mechanism.

The technique can avoid transmitting redundant packets in individually triggered retransmissions. Such retransmissions have a direct negative impact on the latency of the radio communication and this additional latency introduced through retransmissions is highly undesirable, e.g. in URLLC and C-MTC applications requiring both high reliability and low latency.

Besides taking into account both latency and reliability targets, the technique can be implemented as a control mechanism. The control mechanism may control redundancy across time, frequency and spatial streams. Moreover, the control messages may be indicative of at least one of varying QoS requirements (also: QoS targets), varying link characteristics and varying device capabilities. Based on the control messages, different configurations for the transmission of the redundant packet can be used with runtime adaptation. For example, the QoS requirements can be fulfilled with an optimal use of radio resources.

At least one of the transmitter and the receiver may be configured for peer-to-peer communication (e.g., on a sidelink) and/or for accessing the RAN (e.g. an uplink, UL, and/or a downlink, DL). At least one of the transmitter and the receiver may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

At least one of the transmitter and the receiver may be a base station of the RAN. Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the radio communication, the RAN and/or the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a transmitter for transmitting PDUs in a radio communication to a receiver is provided. The transmitter is configured to perform or trigger the one method aspect. Alternatively or in addition, the transmitter may comprise a receiving unit configured to receive one or more control messages indicative of QoS requirements for the radio communication, the QoS requirements including a control command for a reliability of the radio communication and a control command for a latency of the radio communication. The transmitter may further comprise a transmitting unit configured to transmit a batch of redundant PDUs to the receiver, wherein a number of the redundant PDUs per batch depends on the control command for the reliability and a temporal spread of the redundant PDUs per batch depends on the control command for the latency.

As to another device aspect, a receiver for receiving PDUs in a radio communication from a transmitter is provided. The receiver is configured to perform or trigger the other method aspect. Alternatively or in addition, the receiver may comprise a transmitting unit configured to transmit, to the transmitter, one or more control messages indicative of QoS requirements for the radio communication, the QoS requirements including a control command for a reliability of the radio communication and a control command for a latency of the radio communication. The receiver may further comprise a receiving unit configured to receive a batch of redundant PDUs from the transmitter, wherein a number of the redundant PDUs per batch depends on the control command for the reliability and a temporal spread of the redundant PDUs per batch depends on the control command for the latency.

As to a further aspect, a transmitter for transmitting PDUs in a radio communication to a receiver is provided. The transmitter comprises at least one processor and a memory. Said memory comprises instructions executable by said at least one processor whereby the transmitter is operative to receive one or more control messages indicative of QoS requirements for the radio communication, the QoS requirements including a control command for a reliability of the radio communication and a control command for a latency of the radio communication. Execution of the instructions further causes the transmitter to be operative to transmit a batch of redundant PDUs to the receiver, wherein a number of the redundant PDUs per batch depends on the control command for the reliability and a temporal spread of the redundant PDUs per batch depends on the control command for the latency.

As to a further aspect, a receiver for receiving PDUs in a radio communication from a transmitter is provided. The receiver comprises at least one processor and a memory. Said memory comprises instructions executable by said at least one processor whereby the receiver is operative to transmit, to the transmitter, one or more control messages indicative of QoS requirements for the radio communication, the QoS requirements including a control command for a reliability of the radio communication and a control command for a latency of the radio communication. Execution of the instructions further causes the receiver to be operative to receive a batch of redundant PDUs from the transmitter, wherein a number of the redundant PDUs per batch depends on the control command for the reliability and a temporal spread of the redundant PDUs per batch depends on the control command for the latency.

As to a further aspect, a transmitter for transmitting PDUs in a radio communication to a receiver is provided. The transmitter may comprise one or more modules for performing the one method aspect. Alternatively or in addition, the transmitter comprises a reception module for receiving one or more control messages indicative of QoS requirements for the radio communication, the QoS requirements including a control command for a reliability of the radio communication and a control command for a latency of the radio communication. The transmitter further comprises a transmission module for transmitting a batch of redundant PDUs to the receiver, wherein a number of the redundant PDUs per batch depends on the control command for the reliability and a temporal spread of the redundant PDUs per batch depends on the control command for the latency.

As to a further aspect, a receiver for receiving PDUs in a radio communication from a transmitter is provided. The receiver may comprise one or more modules for performing the other method aspect. Alternatively or in addition, the receiver comprises a transmission module for transmitting, to the transmitter, one or more control messages indicative of QoS requirements for the radio communication, the QoS requirements including a control command for a reliability of the radio communication and a control command for a latency of the radio communication. The receiver further comprises a reception module for receiving a batch of redundant PDUs from the transmitter, wherein a number of the redundant PDUs per batch depends on the control command for the reliability and a temporal spread of the redundant PDUs per batch depends on the control command for the latency.

The transmitter (or any node or station for embodying the transmitter) and the receiver (or any node or station for embodying the receiver) may further comprise any feature disclosed in the context of the method aspects. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein:

FIG. 6 schematically illustrates first embodiments of protocol stacks at the transmitter and the receiver in the radio communication;

FIG. 7 schematically illustrates a first example of a pattern of radio resources in time and frequency, on which a batch of redundant protocol data units is transmitted and received by the first embodiments of the protocol stacks;

FIG. 10 schematically illustrates the second example of the pattern of radio resources in time and frequency for a batch of redundant protocol data units;

FIG. 11 schematically illustrates the first example of the pattern of radio resources in time and frequency for a batch of redundant protocol data units;

FIG. 12 schematically illustrates a third example of a pattern of radio resources in time and frequency for a batch of redundant protocol data units;

FIG. 13 schematically illustrates a fourth example of a pattern of radio resources in time and frequency for a batch of redundant protocol data units;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
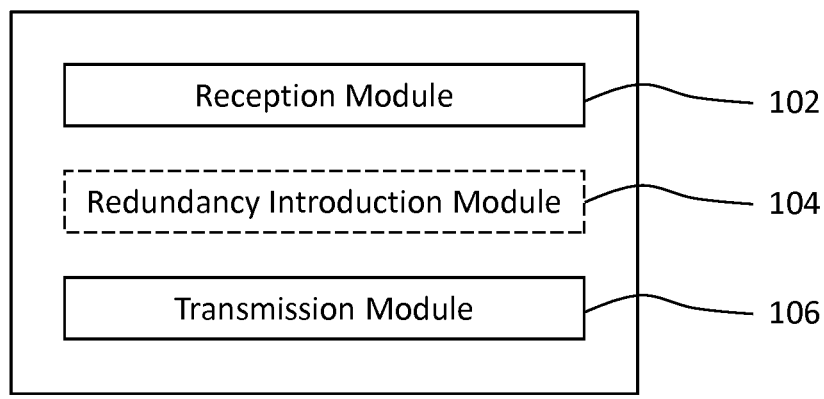
FIG. 1 shows a schematic block diagram of a transmitter for transmitting protocol data units in a radio communication from the transmitter to a receiver.

FIG. 1 schematically illustrates a block diagram of a transmitter for transmitting protocol data units (PDUs) in a radio communication from the transmitter to a receiver. The transmitter, i.e., any device for transmitting PDUs, is generically referred to by reference sign 100.

The transmitter 100 comprises a reception module 102 that receives one or more control messages indicative of Quality of Service (QoS) requirements for the radio communication. The QoS requirements include a control command for a reliability of the radio communication and a control command for a latency of the radio communication. The transmitter 100 further comprises a transmission module 106 that transmits a batch of redundant PDUs from the transmitter 100 to the receiver. A number of the redundant PDUs per batch depends on the control command for the reliability. Furthermore, a temporal spread of the redundant PDUs per batch depends on the control command for the latency.

Optionally, the transmitter 100 further comprises a redundancy introduction module 104 for generating the redundant PDUs. The modules 102, 106 and, where appropriate, 104 may be implemented on a medium access control (MAC) layer or a radio link control (RLC) layer of a protocol stack for the radio communication. The redundant PDUs may be redundant MAC PDUs (e.g., also if the redundancy is introduced at the RLC layer by copying RLC PDUs).

The redundant PDUs may be generated by copying an RLC PDUs at the lower end of the radio link control (RLC) layer (optionally further including an indicator of the batch to which the redundant PDU belongs and/or an indicator of the radio resource position within a radio resource pattern of the batch). Alternatively, the redundant PDUs may be generated by copying service data units (SDUs) at the upper end of the MAC layer.

Any of the modules of the transmitter 100 may be implemented by units configured to provide the corresponding functionality.

Figure 2:
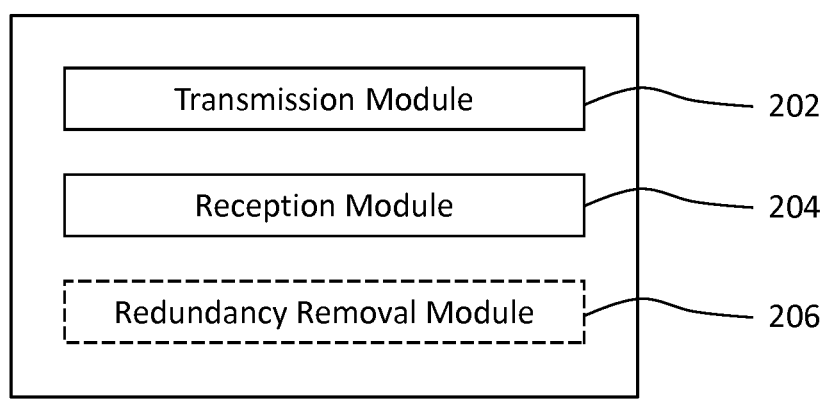
FIG. 2 shows a schematic block diagram of a receiver for receiving protocol data units in a radio communication from a transmitter at the receiver.

FIG. 2 schematically illustrates a block diagram of a receiver for receiving PDUs in a radio communication from a transmitter to the receiver. Reference sign 200 generically refers to the receiver, i.e., any device for receiving PDUs.

The receiver 200 comprises a transmission module 202 that transmits, to the transmitter, one or more control messages indicative of QoS requirements for the radio communication. The QoS requirements include a control command for a reliability of the radio communication and a control command for a latency of the radio communication. The receiver 200 further comprises a reception module 204 that receives a batch of redundant PDUs from the transmitter. A number of the redundant PDUs per batch depends on the control command for the reliability and a temporal spread of the redundant PDUs per batch depends on the control command for the latency.

Optionally, the receiver 200 further comprises a redundancy removal module 206 for removing the redundancy in the received batch of redundant PDUs. The modules 202, 204 and, where appropriate, 206 may be implemented on the MAC layer or an RLC layer of a protocol stack for the radio communication. The redundant PDUs may be redundant MAC PDUs (e.g., also if the redundancy removal module 206 is implemented on the RLC layer).

The redundant PDUs may be removed by forwarding solely one successfully received RLC PDUs (e.g., the first successfully received RLC PDU) at the lower end of the RLC layer (e.g., wherein the redundant PDUs are associated to a certain batch based on an indicator included RLC PDU). Alternatively, the redundant PDUs may be removed by forwarding solely one successfully received MAC PDUs or MAC SDU (e.g., the first successfully received MAC PDU or MAC SDU) at the lower end or the upper end, respectively, of the MAC layer. All other PDUs or SDUs may be discarded.

Any of the modules of the receiver 200 may be implemented by units configured to provide the corresponding functionality.

The receiver in radio communication with the transmitter 100 may be an instance of the receiver 200. The transmitter in radio communication with the receiver 200 may be an instance of the transmitter 100.

The transmitter 100 and/or the receiver 200 may a radio device. The radio device may be connected to and/or part of a radio access network (RAN). The radio device may be embodied by a base station of the RAN, nodes connected to the RAN for controlling the base station or a combination thereof. The base station may encompass a network controller (e.g., a Wi-Fi access point) or a radio access node (e.g. a 3G Node B, a 4G eNodeB or a 5G gNodeB) of the RAN. The base station may be configured to provide radio access. Alternatively or in addition, a radio device (i.e., an implementation of the transmitter 100 and/or the receiver 200) may include a mobile (or portable) station or a radio device connectable to the RAN. The radio device may be a user equipment (UE) and/or a device for machine-type communication (MTC).

The transmitter 100 and the receiver 200 may be configured to wirelessly connect to each other, e.g., in an ad-hoc radio network or via 3GPP sidelinks.

Figure 3:
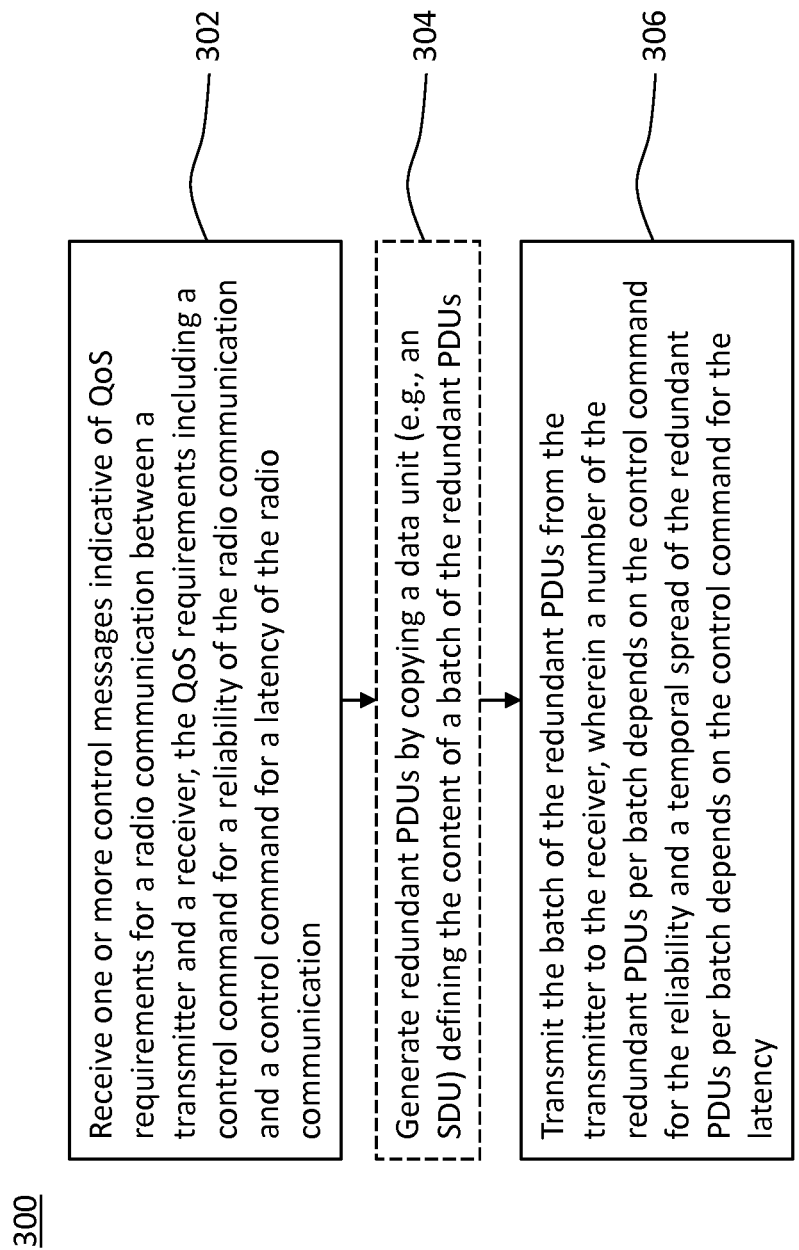
FIG. 3 shows a flowchart for a method of transmitting protocol data units, which is implementable by the transmitter of FIG. 1.

FIG. 3 shows a flowchart for a method 300 of transmitting PDUs in a radio communication from a transmitter to a receiver. The method comprises or triggers a step 302 of receiving one or more control messages indicative of QoS requirements for the radio communication. The QoS requirements include a control command for a reliability of the radio communication and a control command for a latency of the radio communication. The method further comprises or triggers a step 306 of transmitting a batch of redundant PDUs from the transmitter to the receiver. A number of the redundant PDUs per batch depends on the control command for the reliability. A temporal spread of the redundant PDUs per batch depends on the control command for the latency.

Optionally, the method 300 further comprises or triggers a step 304 of generating the redundant PDUs by copying a data unit (e.g., an RLC PDU or a MAC SDU). The data unit may define the content of the batch of redundant PDUs. The step 304 may be a substep of the step 302 or 306.

The method 300 may be performed by the transmitter 100. For example, the modules 102, 104 and 106 may perform the steps 302, 304 and 306, respectively.

Figure 4:
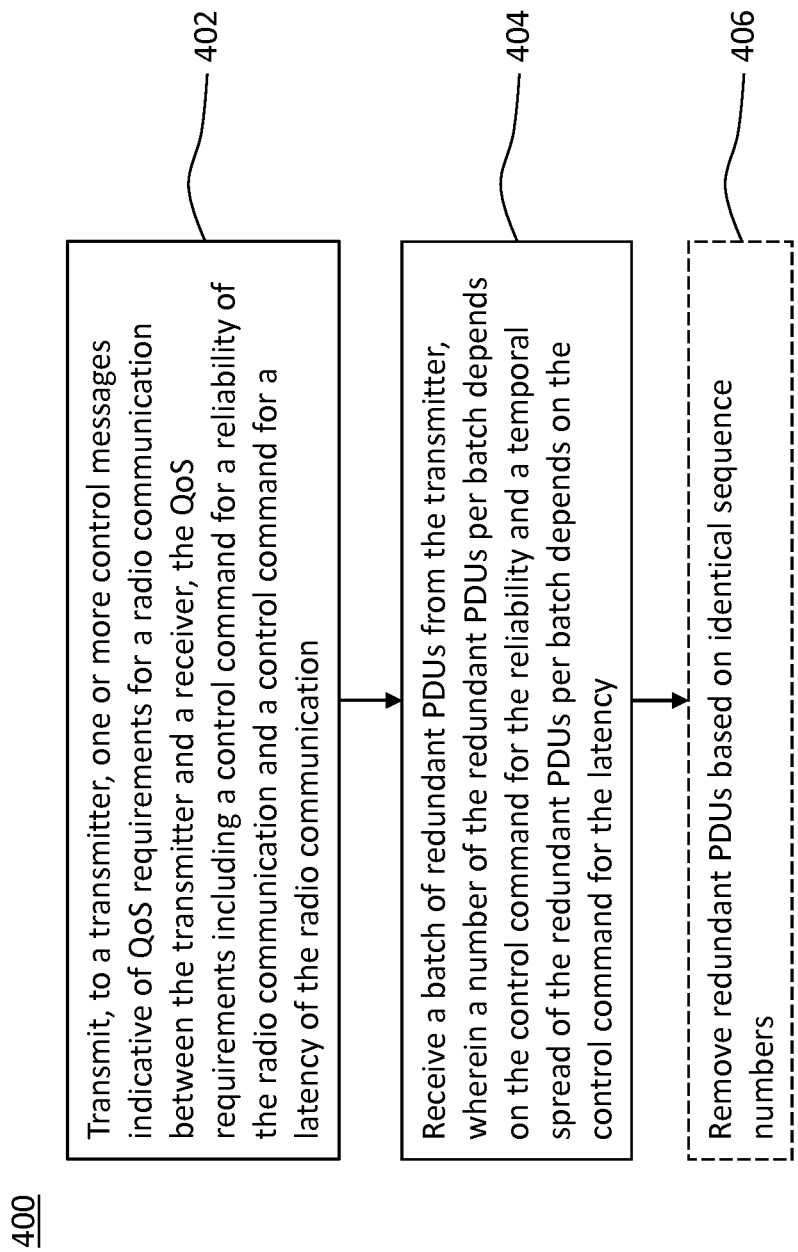
FIG. 4 shows a flowchart for a method of receiving protocol data units, which is implementable by the receiver of FIG. 2.

FIG. 4 shows a flowchart for a method 400 of receiving PDUs in a radio communication from a transmitter to a receiver. The method comprises or triggers a step 402 of transmitting, to the transmitter, one or more control messages indicative of QoS requirements for the radio communication. The QoS requirements include a control command for a reliability of the radio communication and a control command for a latency of the radio communication. The method further comprises or triggers a step 404 of receiving a batch of redundant PDUs from the transmitter. A number of the redundant PDUs per batch depends on the control command for the reliability. A temporal spread of the redundant PDUs per batch depends on the control command for the latency.

Optionally, the method 400 further comprises or triggers a step 406 of removing redundant PDUs based on identical sequence numbers (e.g., an RLC sequence number). Only one of the redundant PDUs, e.g., the first successfully received PDU, of the batch is forwarded towards higher layers as a representative of the entire content of the batch. The step 406 may be a substep of the step 404.

The method 400 may be performed by the receiver 200. For example, the modules 202, 204 and 206 may perform the steps 402, 404 and 406, respectively.

Embodiments of the technique may selectively generate and transmit the batch of redundant PDUs. For example, the redundant batch transmission may be triggered by one of the control messages (e.g., in the steps 302 and 402), e.g., indicative of a C-MTC or URLLC. In the absence of a control message indicative of the trigger for redundant batch transmission, the transmitter 100 and the receiver 200 may maintain compatibility with at least one of IEEE 802.11 (WLAN), IEEE 802.15.1 (WPAN), Bluetooth 4.2 (WPAN), IEEE 802.15.4 (WPAN) and 3GPP LTE Release 12 (4G cellular) or later releases.

The technique can increase the reliability of the radio communication, e.g., as compared to LTE and/or for C-MTC or URLLC use-cases. The transmission reliability can be achieved while also fulfilling the latency requirements for the radio communication.

The PDUs and/or the SDUs may also be referred to as data units, data packets or briefly as "packets". Reliability may be defined as the probability that a certain data packet from the transmitter 100 is successfully delivered to the receiver 200 within a pre-defined delay, i.e., latency. Packet error rate (PER) is used as a measure of reliability at the application level, which is often also referred as block error probability (BLEP) at the lower layers of the protocol stack. By way of example, the high reliability demands of factory automation systems require a BLEP as low as 10-9.

The technique may be implemented by transmitting, in the step 106, multiple redundant packets (e.g., copies of packets) in a pattern across. The pattern may comprise radio resources on (a) consecutive subframes; (b) different carriers (c) different spatial transmissions or spatial streams; or (d) combinations or sub-combinations of the aforementioned. The technique is preferably implemented without relying on explicit (e.g., NACK-triggered) retransmissions. As an advantage of avoiding at least one of individual NACK-triggers and NACK-triggered retransmissions, the latency of the radio communication can be controlled and latency requirements can be fulfilled.

The size of the pattern, i.e., the number of redundant packets transmitted across time, frequency and/or spatial streams, may be controlled by the one or more control messages, e.g., in a redundancy control mechanism, based on the step 302. The redundancy control mechanism may be implemented by exploiting an acknowledgment feedback (e.g., indicative of a positive acknowledgment, ACK, or a negative acknowledgment, NACK) on packets of a previous batch of packets as the feedback of a closed-loop control received in the step 302 to adapt the redundancy in the transmission of the next batch according to the step 306.

Alternatively or in addition, the temporal extent of the pattern, i.e., the temporal spread or distribution of the transmitted redundant packets across time, may be controlled by the one or more control messages, e.g., in a latency control mechanism, based on the step 302.

The redundancy control mechanism and the latency control mechanism may be implemented as one control mechanism. One or each of the number and the temporal spread of the redundant PDUs in the batch may depend on at least one common control command in the control messages, e.g., a network policy or a network load (e.g., of the RAN comprising the transmitter 100), a device capability (e.g., of the receiver 200), the reliability control command and the latency control command for the radio communication.

Alternatively or in addition, the redundancy control mechanism and/or the latency control mechanism may be implemented as a feedback (or closed-loop) control mechanism. The technique may further allow an adaptation and/or a configuration to specific targets for the reliability as well as the latency at runtime. For example, at least one of the reliability and the latency may be changed based on one or more of the control messages after the radio communication has been established. At most one of the reliability (e.g., limit) and the latency (e.g., a limit) may be predefined on or before establishing the radio communication.

While embodiments of the technique are described within the context of 3GPP LTE, particularly in an evolved UMTS terrestrial radio access network (E-UTRAN) as the RAN for concreteness, the skilled person appreciates that the problems and solutions described herein are equally applicable to wireless access networks and UEs implementing other radio access technologies (RATs) and standards, such as 5G or NR and IEEE standards. Hence, although terminology from 3GPP LTE is used herein to exemplify the technique, such terminology imply a technical limitation to any of the mentioned RATs.

Furthermore, terminologies such as base station (particularly, eNodeB or eNB) and UE for the transmitter 100 and the receiver 200 are non-limiting and do not imply a certain hierarchical relation between the transmitter 100 and the receiver 200. In general, the transmitter 100 may be considered as a radio device "1" and the receiver 200 may be considered as a radio device "2". These two devices 100 and 200 communicate with each other over some radio channel. Thus, the radio communication between an eNB and UE are described herein as examples. Any embodiment disclosed herein is readily and/or equally applicable for other nodes in radio communication, e.g., for network-assisted device-to-device (D2D) communication and side-links between UEs.

Figure 5:
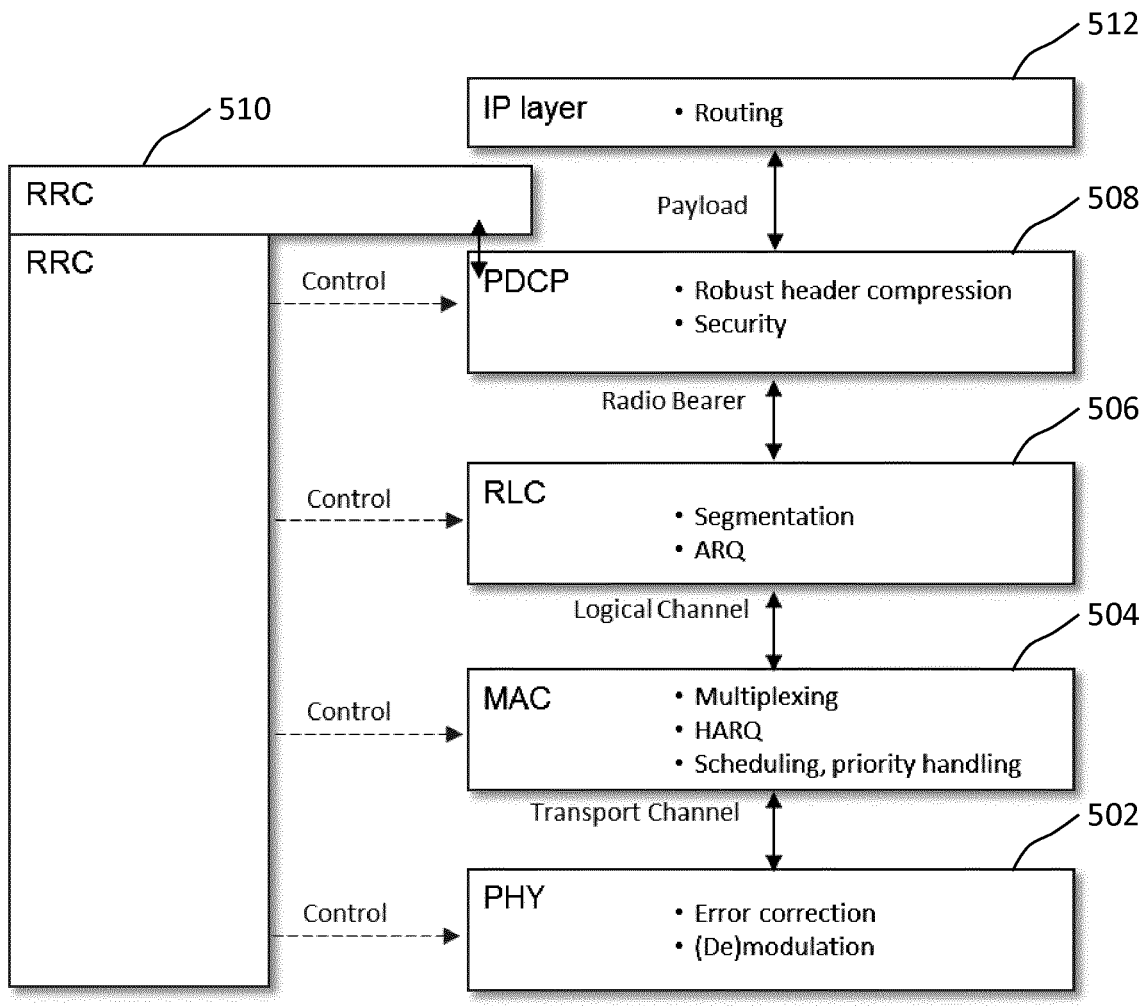
FIG. 5 shows a schematic block diagram for an example of a protocol stack for the radio communication, which is implementable at each of the transmitter and the receiver.

FIG. 5 schematically illustrates a block diagram for an exemplary protocol stack 500 of the radio communication. The protocol stack 500 of 3GPP LTE is outlined in FIG. 5 and briefly described below in the light of the latency and the reliability of the radio communication. Corresponding features for a transmission direction and reception direction may be implemented at the transmitted 100 and the receiver 200, respectively, at least for backward compatibility.

The physical (PHY) layer 502 provides adaptive coding, modulation and power control as well as multi-antenna processing. For physical channels transmitting user data, a 24-bit cyclic redundancy check (CRC) is inserted (in the transmission direction), leading to a residual error of 10-7.

The medium access control (MAC) layer 504 does multiplexing and scheduling of data from different radio bearers. Hybrid ARQ (HARQ) with incremental redundancy is implemented. A typical residual error probability of 10-4 to 10-3 remains within the HARQ protocol, which is mainly due to unreliable but efficient HARQ acknowledgment feedback, e.g., the NACK-to-ACK error probability. In the latter case, the MAC layer at the transmitter 100 erroneously considers the MAC PDU to be successfully received and, thus, refrains from a HARQ retransmission, while a reordering timer at the radio-link control (RLC) layer 506 of the receiver 200 expires and triggers an RLC retransmission according to an ARQ functionality. The RLC retransmission is even more time-consuming than the HARQ retransmission.

The batch of redundant PDUs (e.g., copies of MAC PDUs) transmitted in advance at the MAC layer 504 of the transmitter 100 according to the step 306 marginalizes the possibility that the RLC layer 506 has to be involved. That is, only in the extremely rare case of all the redundant PDUs at the MAC layer 504 of the receiver 200 being received with failure, the RLC layer 506 triggers an RLC retransmission. The control command for the reliability may control the number of redundant PDUs so as to maintain a certain fraction of successfully received PDUs among all the redundant PDUs.

The radio link control (RLC) layer 506 provides segmentation and concatenation of data and, if configured in an acknowledged mode, provides ARQ functionality, i.e., the RLC retransmissions selectively based on a sliding window scheme. The RLC layer 506 provides in-sequence delivery to higher layers. Since both data and RLC ARQ feedback, i.e., the RLC status report, is transmitted using the 24-bit CRC from the PHY layer 502, a residual error probability of 10-7 remains on this layer.

The protocol data convergence protocol (PDCP) on layer 508 provides header compression to reduce overhead, as well as ciphering of data to be transmitted. The PDCP layer 508 at the eNB functions as an anchor point for handovers and provides lossless inter-eNB handover by forwarding outstanding data from source to target eNB. It is affected with the same residual error as on the RLC layer 506, i.e., no additional CRC or ARQ is done on this protocol layer in typical LTE configurations.

The radio resource control (RRC) protocol on layer 510 handles control signaling messages between eNB and UEs, and uses the same LTE protocol stack as user plane, i.e., Internet protocol (IP) data. This means RRC control signaling as well as IP data is sent via the PDCP layer 508, the RLC layer 506, the MAC layer 504 and the PHY layer 502.

In the control plane, the RRC layer 510 is connected to the core network in the non-access stratum (NAS). In the user plane, user traffic is exchanged between the PDCP layer 508 and an IP layer 512.

Since 3GPP LTE Release 10, Carrier Aggregation (CA) enables data exchange between the UE and the eNB on multiple carriers. CA may be implemented by multiple HARQ entities running in parallel (e.g., multiple entities of the PHY layer 502 and parts of the MAC layer 504) per radio communication between a pair of transmitter 100 and receiver 200.

FIG. 6 schematically illustrates first embodiments of protocol stacks 500, which are implementable at the transmitter 100 and the receiver 200, respectively, for the radio communication.

At the side of the transmitter 100 and the receiver 200, the control message reception module 102 and the control message transmission module 202 may be implemented at any of the layers 502 to 508. In the first embodiments illustrated in FIG. 6, at least the modules 104 and 106 as well as the modules 204 and 206 are implemented at the MAC layer 504.

The transmitter 100 comprises the redundancy introduction module 104 (which is also referred to as "add redundancy functionality") at the upper end of the MAC layer 504, i.e., in the MAC layer 504 at the upstream end for processing data to be transmitted. At the side of the transmitter 100, the redundancy is added in terms of outgoing packets, e.g., PDUs at the MAC layer 504. As illustrated in a non-limiting first embodiment of FIG. 6, the redundancy introduction module 104 generates multiple copies of the incoming packets (e.g., RLC PDUs or MAC SDUs) within the MAC layer 504 or between the MAC layer 504 and the RLC layer 506. The redundancy in terms of redundant MAC PDUs (as packets outgoing from the MAC layer 504) may be the result of copying MAC SDUs (as packets incoming to the MAC layer 504). At the side of the receiver 200, the removal of redundancies is also residing at the MAC layer 504.

At the transmitter 100, in the step 306, the transmission module 106 distributes the redundant PDUs (or briefly: "packets") across consecutive HARQ processes.

FIG. 7 schematically illustrates a pattern 700 of radio resources 702 occupied by the redundant PDUs (or "packets") 704 of the batch transmitted in the step 306. The pattern 700 is arranged in a grid including time 706 (e.g., in terms of subframes or TTIs) and radio frequency 708 (e.g., in terms of sub-carries). The PDUs 704 are transmitted on radio resources 702 on consecutive subframes, e.g., on the same carrier and/or set of sub-carriers.

At the receiver 200, the first correct PDU 704 (i.e., the first of the redundant PDUs 704 with positive CRC) is forwarded to the RLC layer 506 (e.g., as an MAC SDU). For all other PDUs 704, no retransmissions will be triggered, e.g., regardless of whether such PDUs are correctly received or incorrectly received (including PDUs that are not at all received).

In one variant of any embodiment, the control messages may be indicative (e.g., by using the ACK and NACK signals as PDU-individual feedback without the NACK signal triggering a retransmission) of the correctly and incorrectly received PDUs in the pattern 700. The transmitter 100 and/or the receiver 200 may gather statistics on the individual radio resources (e.g., resource elements or physical resource blocks). The pattern 700 may be control (i.e., changed for transmissions 306 of redundant PDUs in future) based on the statistics.

In a further variant of any embodiment, which is combinable with the one variant, instead of triggering retransmissions for individual PDUs in the batch a redundancy control mechanism may be triggered in an instance of the step 402, optionally using the acknowledgment feedback of the MAC layer 504 (i.e., the ACK and NACK signals) and/or depending on a ratio of successfully received PDUs for the entire batch. For example, the number of ACK and NACK signals, or their ratio, may represent the control commands.

The number of redundant PDUs (e.g., the number of copies) is configured at runtime by means of the control messages fed back in the steps 302 and 402. A pre-defined redundancy can be introduced by the module 104 based on a service type using, for instance, a look-up table or prior configuration. Moreover, based on the available resources, total traffic load, reliability of the link and the latency bound, an adaption scheme can be applied which controls the redundancy of packets (i.e., the number of redundant PDUs) at runtime.

In the first embodiments of the transmitter 100 and the receiver 200, the redundant PDUs (e.g., the copies) are assigned to consecutive HARQ processes. The scheduler at the MAC layer 504 assigns the redundant PDUs 704 to the 8 HARQ processes (of one HARQ entity) available in an LTE implementation. The redundant PDUs 704 are assigned to consecutive HARQ processes, e.g., an original PDU 704 symbolically represented by X is assigned to a HARQ process i, a duplicate X* of the original PDU 704 is assigned to a HARQ process i+1, and so forth. As a result, the redundant PDUs 704 defining the batch are distributed across consecutive subframes 706.

Advantageously, if the checksum (i.e., the CRC) of the first of the redundant PDUs 704 fails at the receiver 200, the second PDU can already be checked in the second subframe or TTI (e.g., without waiting for triggering and receiving a retransmission). Furthermore, since multiple redundant PDUs 704 are available, the chance that the content (i.e., any one of the redundant PDUs 704) is successfully delivered is increased, particularly in case of short term distortions (e.g., due to fading and multipath propagation) of the channel used for the radio communication. If one of the transmissions is not successful, this will be very likely detected by one of the CRC checksums per HARQ processes.

If at least one of the redundant PDUs 704 is successfully received on the MAC layer 504, the successfully received PDU (e.g., the first PDU with correct CRC) is passed on to the RLC layer 506 (e.g., in a conventional manner). Other introduced redundancies, i.e., other PDUs 704 of the same batch, are discarded.

In any embodiment, two variants are implementable. In one variant (e.g., without controlling the QoS requirements during the radio communication), no acknowledgment feedback (i.e., neither ACK nor NACK) is transmitted. That is, no control messages corresponding to retransmission requests are transmitted by the receiver 200. In another variant (e.g., for a real-time control mechanism), an acknowledgment feedback is transmitted from the receiver 200 for at least some of the other HARQ process, e.g., for each HARQ process associated with the batch. Based on the (positive and negative) acknowledgment feedback transmitted in a later instance of the step 402, the number of redundant PDUs used by the transmitter 100 is controlled, as an example for the redundancy control mechanism.

If all HARQ processes lead to a CRC error at the receiver 200, any embodiment may implement two variants for the respective HARQ process. In one variant (e.g., without controlling the QoS requirements during the radio communication), the erroneous redundancies (i.e., the PDUs 704 received with the negative CRC) are discarded and neither ACK nor NACK is send, i.e., no retransmissions are requested. In another variant (e.g., for a real-time control mechanism), one or more (negative) acknowledgment feedbacks are transmitted from the receiver 200 to the transmitter 100, which applies the redundancy control mechanism accordingly.

Figures 8, 9:
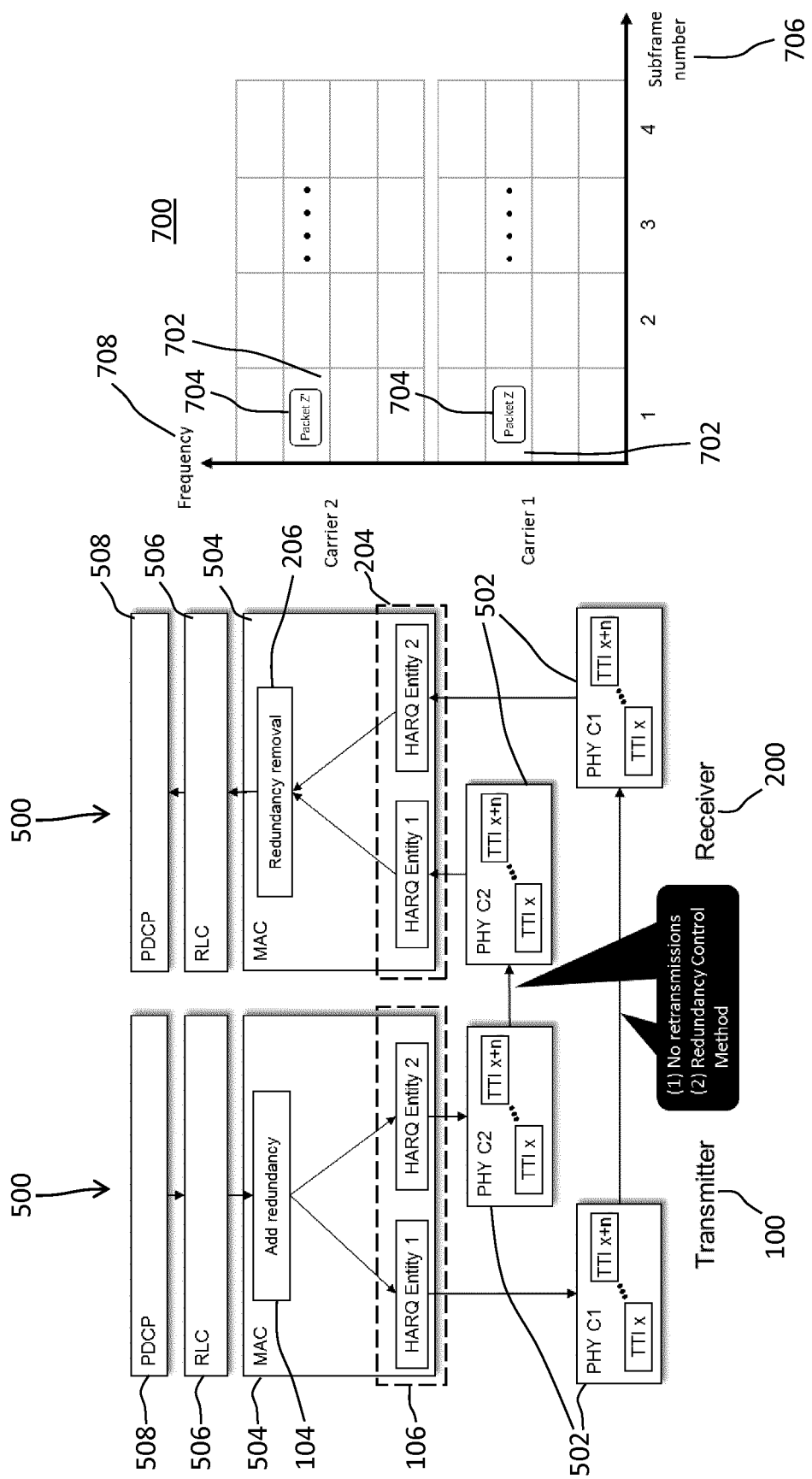
FIG. 8 schematically illustrates second embodiments of protocol stacks at the transmitter and the receiver in the radio communication.
FIG. 9 schematically illustrates a second example of a pattern of radio resources in time and frequency, on which a batch of redundant protocol data units is transmitted and received by the second embodiments of the protocol stacks.

In second embodiments of the transmitter 100 and the receiver 200, respectively, the redundant PDUs 704 (e.g., the copies) are assigned to different HARQ entities. FIG. 8 schematically illustrates block diagrams for the protocol stacks 500 at the transmitter 100 and the receiver 200, respectively, according to the second embodiment. Redundant PDUs 704 are distributed across different HARQ entities in the transmission module 106 at the transmitter 100, which leads to a pattern 700 of radio resources 702 carrying the redundant PDUs 704 on at least two different carriers, as schematically illustrated in the FIG. 9 on a grid spanned by time 706 and frequency 708. Alternatively or in addition, the different HARQ entities may be associated with different spatial streams.

The redundant PDUs 704 are transmitted in the step 306 on different carriers (e.g., sub-bands, optionally using CA). The first of the redundant PDU 704 that is correctly received at the receiver 200 is forwarded to the RLC layer 506. For all other packets, no retransmissions will be triggered. Rather, in any embodiment, a redundancy control mechanism may be triggered by means of the control messages in further instances of the step 402.

While a subset or all of the redundant PDUs 704 (e.g., copies) are assigned to consecutive HARQ processes (e.g., of one HARQ entity) in the first embodiments, the second embodiments assign a subset or all of the redundant PDUs 704 (e.g., copies) to different (i.e., multiple) HARQ entities in the transmission module 106. As a result, the disjoint subsets of the redundant PDUs 704 (e.g., copies) are transmitted on different carriers. This has the advantage that the redundant PDUs 704 are protected by entirely different channel conditions of the different carriers. If one carrier suffers from interference, the others might still have good channel conditions.

In the non-limiting second embodiments schematically illustrated in FIGS. 8 and 9, two sub-bands is used. Similar to the first embodiments, i.e., the usage of consecutive HARQ processes, if any one of the PDUs 704 is send successfully via any of the HARQ entities from the transmitter 100 to the receiver 200, the first PDU 704 with the correct CRC is passed on to the RLC layer 506. Other redundant PDUs 704 (e.g., copies) are discarded.

In one variant, combinable with any embodiment, no acknowledgment feedback, i.e. neither ACK nor NACK, is send by the receiver 200, i.e., no retransmissions are issued. In another variant, the first packet with the correct CRC is simply passed on to the RLC layer, and for the other HARQ entities and the HARQ processes therein, control messages (e.g., reusing the existing acknowledgment feedback) are transmitted in further instances of the steps 402, which serve as the feedback of the redundancy control mechanism obeyed by the transmitter 100 in the subsequent instance of the transmission step 306.

If all HARQ processes in all HARQ entities lead to a CRC error, any embodiment may implement one of the following two variants. In one variant, erroneous duplications are discarded, and neither ACK nor NACK is send back to the transmitter 100, i.e., no retransmissions are requested. In another variant, the redundancy control mechanism is applied by transmitting one or more control messages according to the step 402.

An implementation of the redundancy control mechanism, which is implementable by any of the embodiments, is described. Adding redundancies in the step 304 can lead to a significant overprovisioning of the radio resources 702. In order to control the amount of redundancies, i.e., the size of the pattern 700 or the number of redundant PDUs 704 in the pattern 700, while still being able to achieve the required reliability of the radio communication, a feedback is transmitted as an instance of the control messages. The feedback is based on the number of CRC fails, e.g., determined by the HARQ entities and the HARQ processes therein. The number of CRC fails per batch is as an indicator that steers the number of radio resources 702 and the corresponding number of redundant PDUs 704 transmitted on such radio resources 702 (e.g., in the respective HARQ entities and HARQ processes therein) according to the step 306. Moreover, if the latency requirements are satisfied and enough radio resources 702 are available, the remaining radio resources are feedback-controlled to steer the reliability of the radio communication, i.e., the number of redundancies.

The feedback for the feedback control mechanism may be implemented using, and reinterpreting, an existing acknowledgment feedback, e.g., in the HARQ signaling. Such a feedback in the control messages can be readily implemented, e.g., in existing LTE networks, and is applicable in other systems.

In a first feedback implementation, command interpretations of an ACK bit in the acknowledgment feedback (as an instance of the control message) are applied with the following meaning (which deviates from a conventional interpretation of HARQ feedbacks). "No ACK", i.e., a missing ACK, is indicative of the number of redundant copies being appropriate, i.e., the transmitter 100 maintains the number of redundant PDUs per batch when receiving no ACK, e.g., with respect to the last batch. An ACK bit being equal to "0" indicates to the transmitter 100 that the number of redundant copies can be decreased and/or should be decrease. An ACK bit being equal to "1" indicates that the number of redundant copies can be increased and/or should be increased.

In a second feedback implementation, the acknowledgment feedback (as an instance of the control message) comprises (e.g., at least) two ACK bits with the following command interpretation. The acknowledgment feedback comprising "00" is indicative of the number of redundant copies being appropriate, i.e. no change of the number of redundant PDUs 704 per batch is commanded. The acknowledgment feedback comprising "01" is indicative to the transmitter 100 that the number of redundant copies or should can be decreased. The acknowledgment feedback comprising "10" is indicative to the transmitter 100 that the number of redundant copies can or should be increased. No command may be associated with the bit string "11" in the acknowledgment feedback, and/or this value may be interpreted as a transmission error in the acknowledgment feedback.

In a third feedback implementation, multiple acknowledgment feedbacks (as an instances of the control messages) relating to the same batch of previously transmitted redundant PDUs 704 (e.g., all acknowledgment feedbacks relating to the same batch) are collectively interpreted by the transmitter 100 as a feedback command for controlling reliability and/or latency. The acknowledgment feedbacks may comprise one or multiple ACKs and/or one or multiple NACKs with respect to the same batch of redundant PDUs 704. The acknowledgment feedbacks, received in one or more instances of the step 302, trigger the following feedback control commands at the transmitter 100. A single ACK is indicative of the number of redundant PDUs 704 per batch being appropriate, i.e., the transmitter 100 maintains the number of redundant PDUs 704 per batch unchanged. Multiple ACKs are indicative to the transmitter 100 that the number of redundant PDUs 704 can or should be increased. For example, two or three ACKs may be indicative of increasing the number of redundancies by two or three redundant PDUs 704, respectively. Multiple NACKs are indicative that the number of redundant PDUs 704 per batch can or should be decreased, e.g., two or three NACKs to decrease the number of redundancies by two or three, respectively.

In a fourth feedback implementation, the one or more control messages may comprise one or more dedicated data messages, e.g., with the following meaning.

One or more of the control messages may comprise a bit string (e.g., more than 2 bits) or a certain data message. The bit string or the data message may directly be indicative of a varying step size for incrementing and/or decrementing the number of redundant PDUs 704 per batch.

Since both the transmitter 100 and the receiver 200 have to support a certain embodiment (e.g., the first, second or both embodiments) and/or a certain implementation (e.g., one of the four feedback implementations), the transmitter 100 and the receiver 200 may be configuration (e.g., pre-configured at deployment and/or by an initial control message). Alternatively or in addition, the configuration may be determined in a negotiation between the transmitter 100 and the receiver 200, e.g., upon establishing the radio communication.

Any one of the feedback implementations is combinable with any one of the embodiments. Furthermore, the embodiments, particularly the first and second embodiments, are not mutually exclusive. Components from one exemplary embodiment may be present in another exemplary embodiment. A person skilled in the art can readily implement such components described in the context of one exemplary embodiment in the other exemplary embodiments.

FIGS. 10 to 13 show non-limiting examples of introducing redundancy in patterns 700 to achieve reliability with different latency requirements (also referred to as latency targets). The pattern 700 may be determined and/or changed by the transmitter 100 in response to the control messages, e.g., at runtime. The factors influencing such a decision include the QoS requirements (also referred to as QoS targets) themselves (i.e., latency and reliability targets) as well as, optionally, the available radio resources, their individual quality and/or the overall traffic characteristics.

The extent of the pattern in the temporal direction 706 is limited by the latency requirement. An example in FIG. 10 schematically illustrates a pattern 700 fulfilling tighter latency requirements compared to FIG. 11 and FIG. 12. The scheme in FIG. 11 is exercised compared to FIG. 10 if the latency requirement is not as tight or if radio resources are not available on another carrier. A decision for the pattern 700 according to FIG. 11 may be triggered based on the quality of the carrier itself.

FIG. 13 schematically illustrates a pattern 700 that achieves the highest degree of reliability, e.g., compared to the other three patterns in FIGS. 10 to 12. The pattern 700 of FIG. 13 may be the result of combining the first and second embodiments.

In radio communication may comprise an uplink transmission (e.g., from an UE as the transmitter 100 to an eNodeB as the receiver 200) and/or a downlink transmission (e.g., from an eNodeB as the transmitter 100 to UE as the receiver 200). Moreover, the technique is applicable for the radio communication comprising a D2D communication.

While the example patterns 700 of FIGS. 10 to 13 extend in time 706 and frequency 708, the patterns 700 may, alternatively or in addition to the diversity in frequency 708, extend in different spatial streams. That is, the pattern 700 of the radio resources 702 for the redundant PDUs 704 are distributed across time, frequency and/or spatial streams in order to satisfy the reliability as well as latency requirements. The pattern 700 is also referred to as redundancy options.

The patterns may be further tailored (e.g., redundancy options may be selected, configured, granted and/or assigned) based on the device capabilities and/or deployment conditions. For instance, a radio device (e.g., taking either the role of the transmitter 100 or the receiver 200, e.g., an MTC device) may be incapable of supporting multi-frequency band operations and/or spatial multiplexing for uplink transmissions. The pattern 700 of radio resources 702 used for the radio communication involving such a radio device is selected and/or configured with the device capabilities as addition constraints.

Above embodiments (e.g., as to one or more HARQ entities with one or more HARQ processes) and above variants and implementations (e.g., as to the redundancy control mechanism and its feedback) are combinable. The technique may be combined to further increase the reliability and capacity utilizations. For example, redundant PDUs 704 may be transmitted though different HARQ entities, which in turn may transmit the PDUs 704 redundantly over consecutive HARQ processes.

In addition, the redundancy control mechanism may collect the feedback (as one or more control messages) from each HARQ entity. Based on the feedback of each HARQ entity, the control mechanism may adjust the number of redundant PDUs 704 per batch and/or per HARQ entity, and distribute the PDUs 704 accordingly, e.g., using any of the example patterns 700. For example, more redundancies (i.e., more of the redundant PDUs 704 in the batch) may be transmitted over one of the HARQ entities that requested more redundancies.

The technique may be implemented exclusively on the MAC layer 504 of the transmitter 100 and the receiver 200. The technique may be transparent to other layers, e.g., the PHY layer 502 and/or the RLC layer 506. The RLC layer 506 may be unaffected by the technique. Moreover, the RLC layer 506 may be configured such that ARQ is enabled or disabled (i.e., acknowledged mode, AM, or unacknowledged mode, UM, of the RLC layer 506). Performing ARQ at the RLC layer 506 can significantly increase the reliability at the cost of increasing delays (and, thus, latency). Typically, an RLC retransmission can lead to multiple MAC HARQ retransmissions, which affect the RLC delay. Since in the technique may be implemented to reduce or avoid MAC HARQ retransmissions, the RLC retransmission can also be reduced by the technique (e.g., even without changes to the RLC layer 506).

Figure 14:
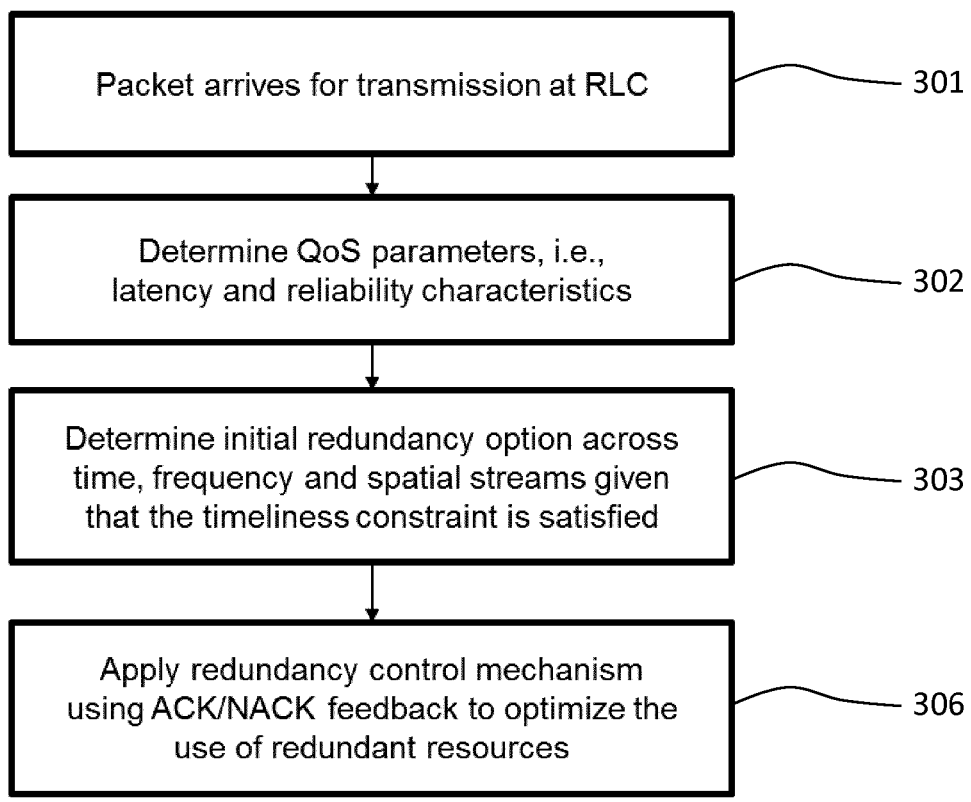
FIG. 14 shows a flowchart for a first method embodiment of the method of FIG. 3.

FIG. 14 shows a flowchart for a first method embodiment of the method 300 of FIG. 3, which is combinable with any implementation or embodiment disclosed herein. The method 300 may be performed in batches, wherein an arrival 301 of a packet, e.g., an SDU for the MAC layer 504 from the RLC layer 506, triggers the method 300, particularly the transmission 306 of a corresponding batch, i.e., a batch of redundant PDUs 704 each including the content of the packet.

In the step 302, the QoS requirements are determined based on the control messages, which may include initial control messages upon deployment of the pair of transmitter 100 and the receiver 200 or upon setting up the radio communication and/or feedback control messages (e.g., the acknowledgment feedback) received in response to a batch previously transmitted on the same radio communication.

In a step 303 of the method, the pattern 700 may be determined. The step 303 may be implemented as a substep of the step 304 or 306.

Figure 15:
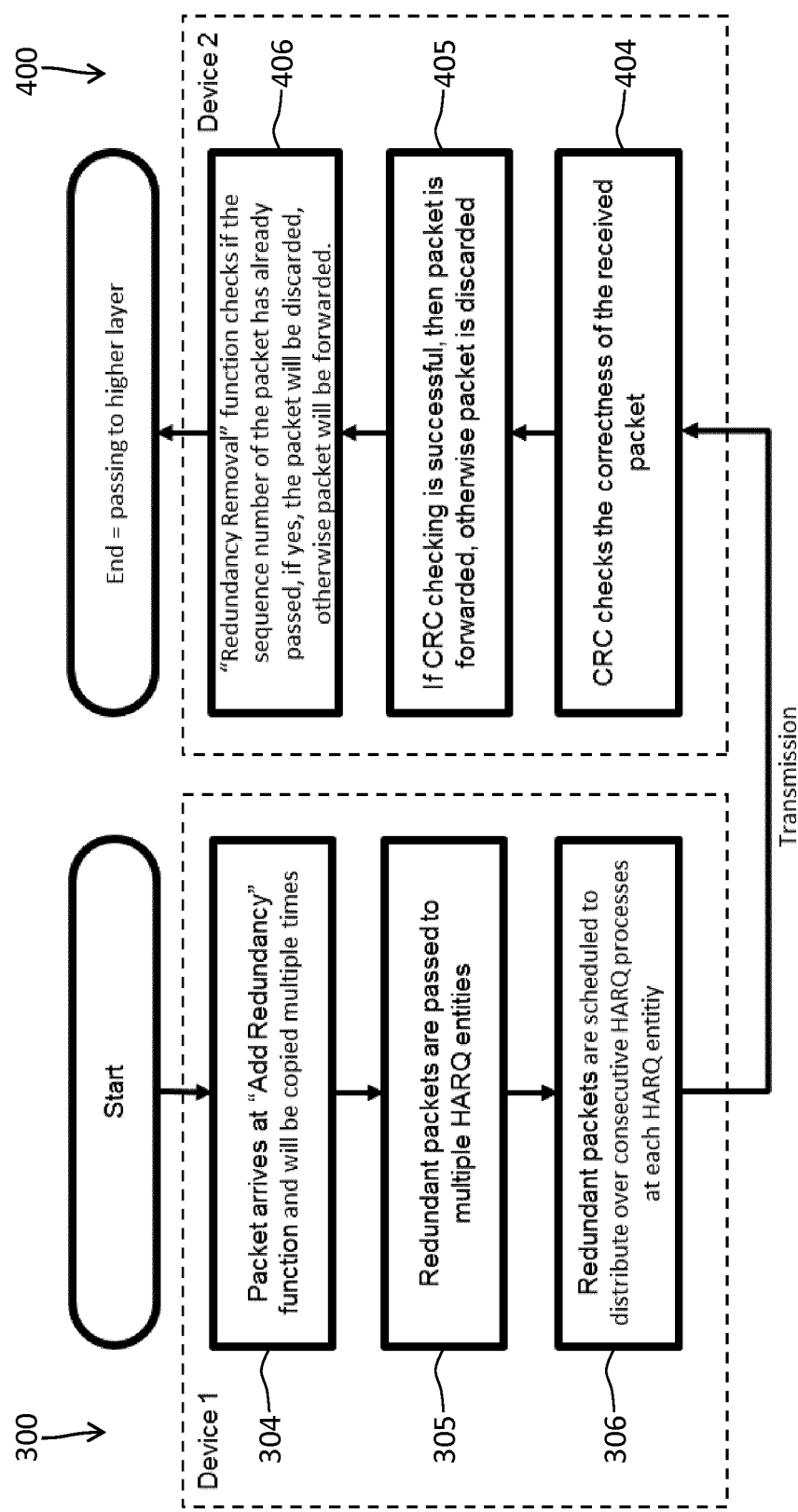
FIG. 15 shows a flowchart for second method embodiments of the methods of FIGS. 3 and 4.

FIG. 15 shows a flowchart for second method embodiments of the methods 300 and 400 of FIGS. 3 and 4, respectively. Implementations of the steps of the methods 300 and 400 are indicated by corresponding reference signs. In a step 305 of the method 300 the redundant PDUs 704 are passed to the multiple HARQ entities, e.g., according to the second embodiment of the transmitter 100, in order to transmit in the step 306 those PDUs according to the pattern 700. The step 305 may be combined with the step 303 of the first method embodiment of FIG. 14 and/or may be a substep of the step 304 or 306.

In the second method embodiment of FIG. 15, the redundant PDUs 704 may be transmitted over multiple HARQ entities and HARQ processes without the redundancy control mechanism. The one or more control messages (on which the step 304 is based) may be configuration messages received upon deployment in the step 302.

The selective forwarding 405 performed by the receiver 200 may be a substep of a CRC verification in the step 404 or may be implemented in the removal step 406. The removal of redundant PDUs 704 may be based on the RLC sequence number, which is identical in the redundant PDUs 704 as they include identical copies of the RLC PDU. Thus, the redundancy removal module 206 performing the step 406 may include a list or window of forwarded RLC sequence numbers ensuring that each RLC sequence numbers is forwarded to the RLC layer 506 only one.

Figure 16:
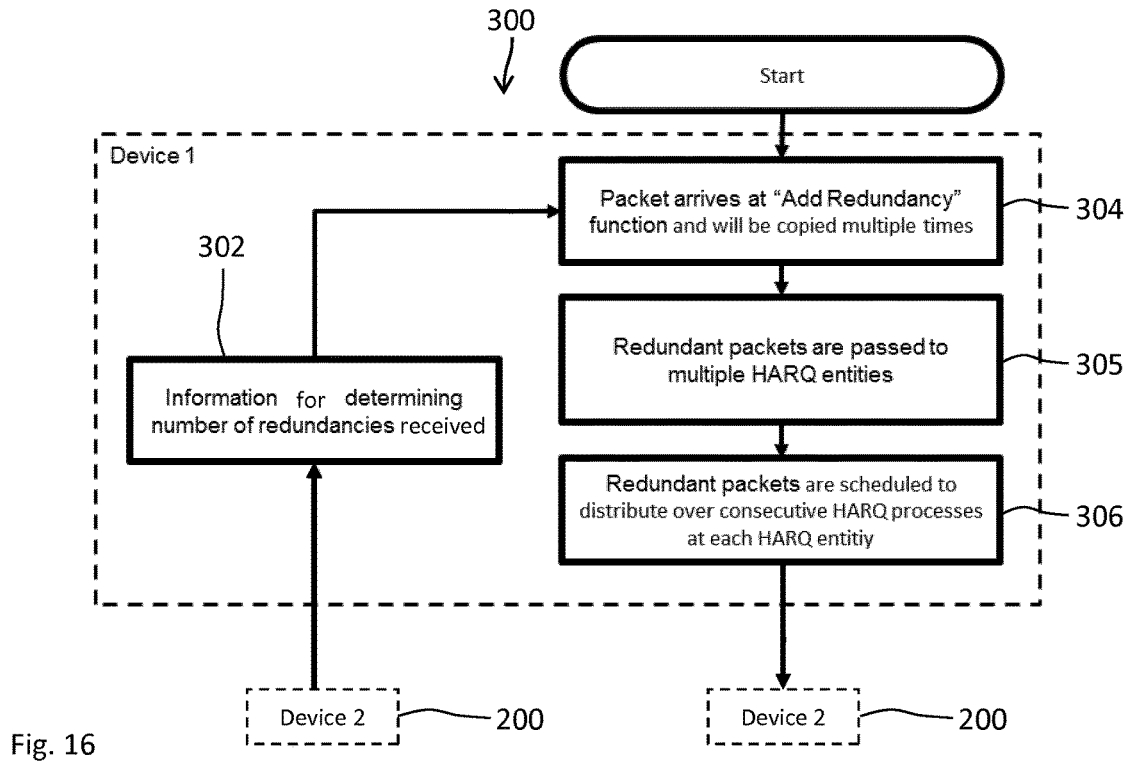
FIG. 16 shows a flowchart for a third method embodiment of the method of FIG. 3.
Figure 17:
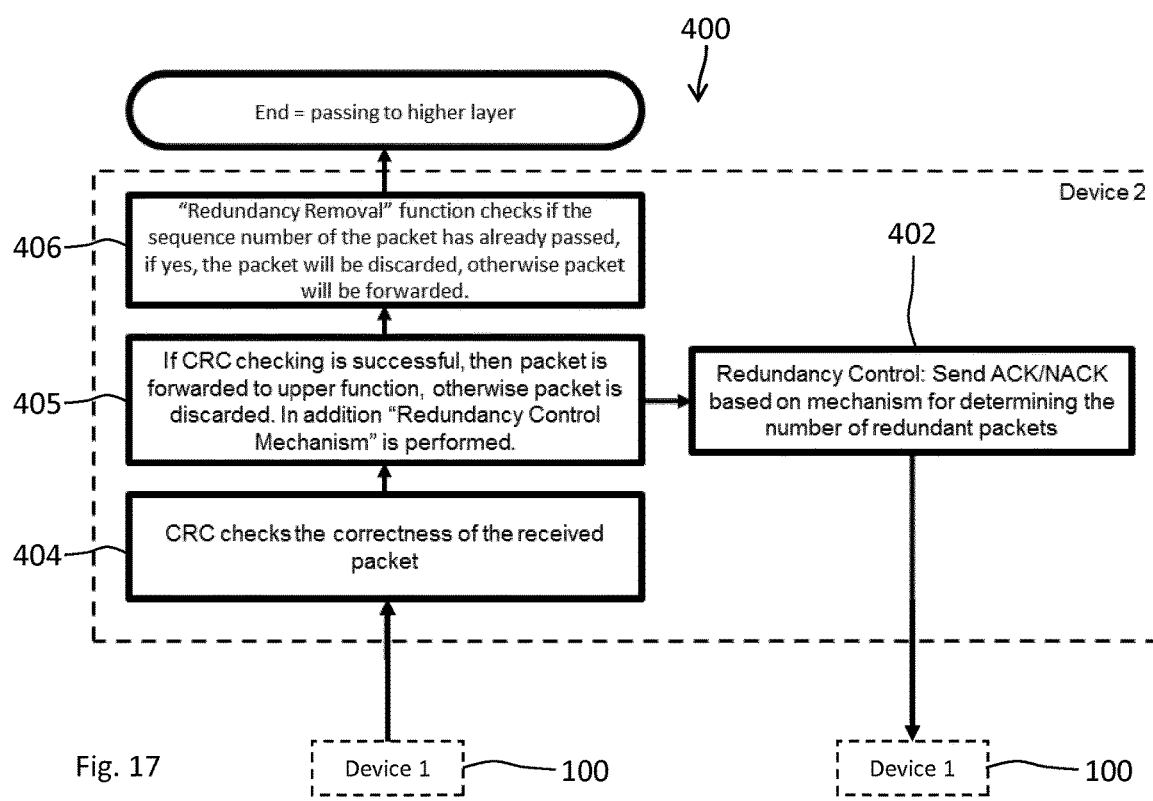
FIG. 17 shows a flowchart for a third method embodiment of the method of FIG. 4.

FIG. 16 shows a flowchart for a third method embodiment of the method 300 of FIG. 3. FIG. 17 shows a flowchart for a third method embodiment of the method 400 of FIG. 4. The third method embodiments may be implemented as an alternative to the respective second method embodiments in that the implementation does not require configuring the transmitter 100 and the receiver 200 upon deployment. The QoS requirements are defined based on the feedback from the receiver 200 to the transmitter 100 in the step 302 and 402 for the redundancy control mechanism. Alternatively, the third method embodiments may be implemented as an extension of the respective second method embodiments so that the QoS requirements preconfigured at deployment are changed during the radio communication by the redundancy control mechanism based on the feedback.

Figure 18:
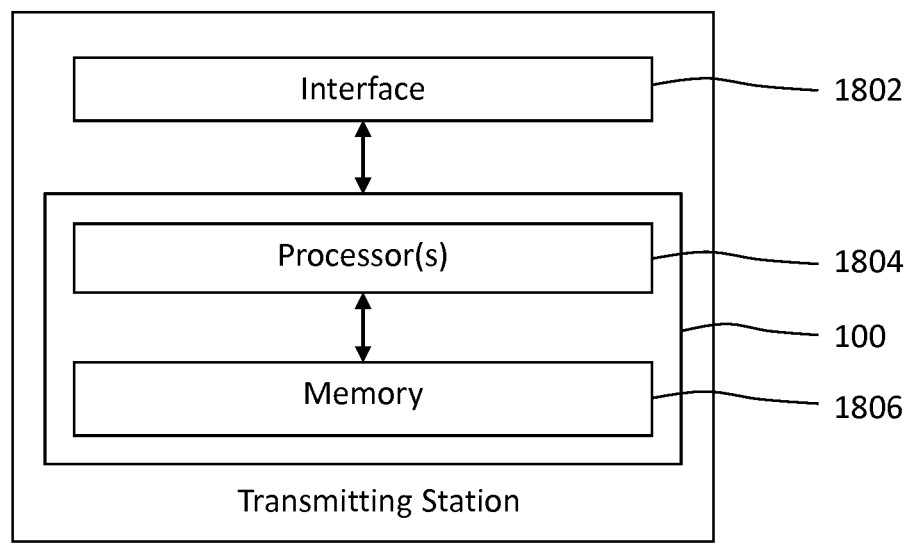
FIG. 18 shows a schematic block diagram of an embodiment of the transmitter.

FIG. 18 shows a schematic block diagram for an embodiment of a transmitting station 1800 embodying the transmitter 100. The transmitter 100 comprises one or more processors 1804 for performing the method 300 and memory 1806 coupled to the one or more processors 1804. For example, the memory 1806 may be encoded with instructions that implement at least one of the modules 102, 104 and 106.

The one or more processors 1804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the transmitter 100, such as the memory 1806, transmitter functionality. For example, the one or more processors 1804 may execute instructions stored in the memory 1806. Such functionality may include providing various features and steps discussed herein, including any of the benefits disclosed herein. The expression "being operative to perform an action" may denote the transmitter 100 being configured to perform the action.

As schematically illustrated in FIG. 18, the transmitter 100 may be embodied by a transmitting station 1800 (e.g., a base station or a mobile station). The transmitting station 1800 comprises a radio interface 1802 coupled to the transmitter 100 for radio communication with one or more receivers.

Figure 19:
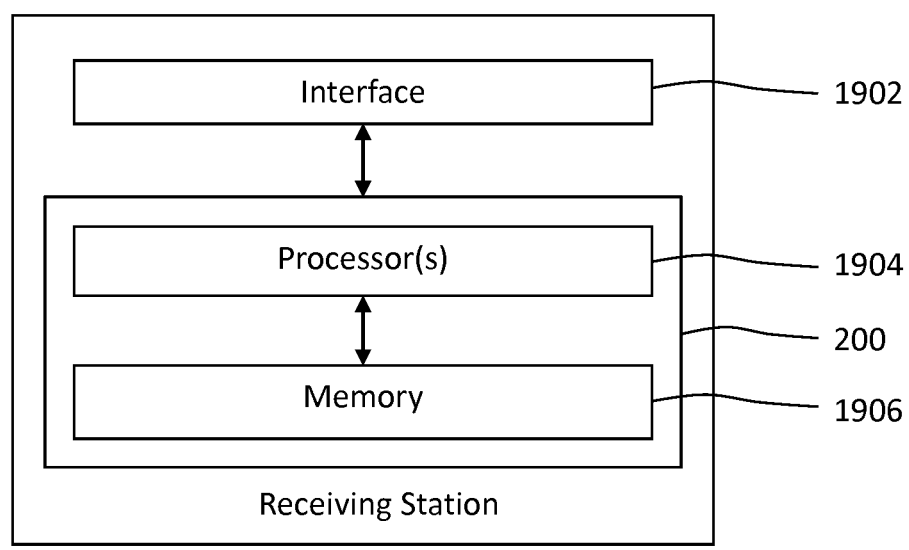
FIG. 19 shows a schematic block diagram of an embodiment of the receiver.

FIG. 19 shows a schematic block diagram for an embodiment of a transmitting station 1900 embodying the receiver 200. The receiver 200 comprises one or more processors 1904 for performing the method 400 and memory 1906 coupled to the one or more processors 1904. For example, the memory 1906 may be encoded with instructions that implement at least one of the modules 202, 204 and 206.

The one or more processors 1904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the receiver 200, such as the memory 1906, receiver functionality. For example, the one or more processors 1904 may execute instructions stored in the memory 1906. Such functionality may include providing various features and steps discussed herein, including any of the benefits disclosed herein. The expression "being operative to perform an action" may denote the receiver 200 being configured to perform the action.

As schematically illustrated in FIG. 19, the receiver 200 may be embodied by a receiving station 1900 (e.g., a base station or a mobile station). The transmitting station 1900 comprises a radio interface 1902 coupled to the receiver 200 for radio communication with one or more transmitters.

As has become apparent from above description, embodiments of the technique enable higher reliability of a communication system (e.g., LTE, NR, UMTS, etc.) by introducing redundant packet transmissions in a controlled manner. Same or further embodiments can obtain reduced transmission latency while ensuring the reliability target. The reliability may be governed through redundant transmissions.

An adaptive mechanism (e.g., a feedback control mechanism) can change the reduced latency and the improved reliability for different use-cases (e.g., C-MTC or URLL, etc.) and, optionally, for different channel and/or traffic characteristics. The adaptive mechanisms allow the communication system to handle variable traffic patterns, and different QoS requirements at runtime, i.e., different latency and reliability requirements. Alternatively or in addition, utilization of radio capacity can be improved by means of the redundancy control scheme.

The technique can be deployed by applying upgrades in terms of functionality and/or configuration to existing systems (e.g., 3GPP LTE systems). The upgrades allow supporting URLL or C-MTC application targets, particularly rapidly changing targets.

The technique can be implemented based on simulations using a software-defined radio (SDR) framework (e.g., existing simulators designed to support development, deployment and/or maintenance of real-time software radio applications) or any experimental or commercial prototype, e.g., for implementing the functional dependency of the pattern on the QoS requirements and the channel state. Comprehensive system-level simulations of the method embodiments, e.g., for a realistic factory automation deployment, indicate that QoS requirements are met and that introducing redundant packets at the MAC layer according to the technique can avoid retransmissions and, thus, can avoid delays caused by the temporal unavailability of retransmission resources.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A transmitter for transmitting protocol data units, PDUs, in a radio communication to a receiver, the transmitter comprising at least one processor and a memory, said memory comprising instructions executable by said at least one processor, whereby the transmitter is operative to:

receive one or more control messages indicative of Quality of Service, QoS, requirements for the radio communication, the QoS requirements including a control command for a reliability of the radio communication and a control command for a latency of the radio communication;

transmit a batch of redundant PDUs to the receiver, wherein a number of the redundant PDUs per batch depends on the control command for the reliability and a temporal spread of the redundant PDUs per batch depends on the control command for the latency; and at least one of the temporal spread of the redundant PDUs per batch and the number of the redundant PDUs per batch further depending on a channel state of a channel used for the radio communication from the transmitter to the receiver.

2. The transmitter of claim 1, wherein at least one of:

the control command for the reliability includes a reliability requirement for the reliability of the radio communication, and the number of the redundant PDUs per batch depends on the reliability requirement; and the control command for the latency includes a latency requirement for the latency of the radio communication, and wherein the temporal spread of the redundant PDUs per batch depends on the latency requirement.

3. The transmitter of claim 2, wherein the latency requirement corresponds to a time interval encompassing all the radio resources on which the redundant PDUs of the batch are transmitted.

4. The transmitter of claim 1, wherein at least one of the one or more control messages is indicative of a device capability of the receiver or a device category of the receiver, wherein the device capability or the device category implies one or each of the QoS requirements.

5. The transmitter of claim 1, wherein at least one of the one or more control messages is indicative of at least one of a network configuration and a network capability, and wherein the number of the redundant PDUs per batch, the temporal spread of the redundant PDUs per batch, or both the temporal spread of the redundant PDUs per batch and the number of the redundant PDUs per batch further depends on at least one of the network configuration and the network capability.

6. The transmitter of claim 1, wherein the transmitter is operative to receive at least one of the one or more control messages from the receiver.

7. The transmitter of claim 1, wherein the transmitter is operative to be in radio communication with multiple receivers, each providing at least one of the one or more control messages, and wherein number of the redundant PDUs per batch, the temporal spread of the redundant PDUs per batch, or both the temporal spread of the redundant PDUs per batch and the number of the redundant PDUs per batch depends on the one or more control messages received from the multiple receivers.

8. The transmitter of claim 1, wherein at least one of the one or more control messages includes a configuration message received upon setting up the radio communication.

9. The transmitter of claim 1, wherein the reliability requirement corresponds to a bit-error rate or bit-error ratio, BER, or a packet-error ratio (PER) of the redundant PDUs.

10. A receiver for receiving protocol data units, PDUs, in a radio communication from a transmitter, the receiver comprising at least one processor and a memory, said memory comprising instructions executable by said at least one processor, whereby the receiver is operative to:

transmit, to the transmitter, one or more control messages indicative of Quality of Service, QoS, requirements for the radio communication, the QoS requirements including a control command for a reliability of the radio communication and a control command for a latency of the radio communication;

receive a batch of redundant PDUs from the transmitter, wherein a number of the redundant PDUs per batch depends on the control command for the reliability and a temporal spread of the redundant PDUs per batch depends on the control command for the latency; and at least one of the temporal spread of the redundant PDUs per batch and the number of the redundant PDUs per batch further depending on a channel state of a channel used for the radio communication from the transmitter to the receiver.

11. The receiver of claim 10, further comprising the step of:

removing redundant PDUs from the batch based on identical sequence numbers included in the redundant PDUs.

12. The receiver of claim 10, wherein at least one of:

the control command for the reliability includes a reliability requirement for the reliability of the radio communication, and the number of the redundant PDUs per batch depends on the reliability requirement; and the control command for the latency includes a latency requirement for the latency of the radio communication, and wherein the temporal spread of the redundant PDUs per batch depends on the latency requirement.

13. The receiver of claim 12, wherein the latency requirement corresponds to a time interval encompassing all the radio resources on which the redundant PDUs of the batch are transmitted.

14. The receiver of claim 10, wherein at least one of the one or more control messages is indicative of a device capability of the receiver or a device category of the receiver, wherein the device capability or the device category implies one or each of the QoS requirements.

15. The receiver of claim 10, wherein at least one of the one or more control messages is indicative of at least one of a network configuration and a network capability, and wherein the number of the redundant PDUs per batch, the temporal spread of the redundant PDUs per batch, or both the temporal spread of the redundant PDUs per batch and the number of the redundant PDUs per batch further depends on at least one of the network configuration and the network capability.

16. The receiver of claim 10, wherein the reliability requirement corresponds to a bit-error rate or bit-error ratio, BER, or a packet-error ratio (PER) of the redundant PDUs.

17. A method of transmitting protocol data units, PDUs, in a radio communication from a transmitter to a receiver, the method comprising:

receiving one or more control messages indicative of Quality of Service, QoS, requirements for the radio communication, the QoS requirements including a control command for a reliability of the radio communication and a control command for a latency of the radio communication; and transmitting a batch of redundant PDUs from the transmitter to the receiver, wherein a number of the redundant PDUs per batch depends on the control command for the reliability and a temporal spread of the redundant PDUs per batch depends on the control command for the latency; and at least one of the temporal spread of the redundant PDUs per batch and the number of the redundant PDUs per batch further depending on a channel state of a channel used for the radio communication from the transmitter to the receiver.

18. A method of receiving protocol data units, PDUs, in a radio communication from a transmitter at a receiver, the method comprising or triggering the steps of:

transmitting, to the transmitter, one or more control messages indicative of Quality of Service, QoS, requirements for the radio communication, the QoS requirements including a control command for a reliability of the radio communication and a control command for a latency of the radio communication;

receiving a batch of redundant PDUs from the transmitter, wherein a number of the redundant PDUs per batch depends on the control command for the reliability and a temporal spread of the redundant PDUs per batch depends on the control command for the latency; and at least one of the temporal spread of the redundant PDUs per batch and the number of the redundant PDUs per batch further depending on a channel state of a channel used for the radio communication from the transmitter to the receiver.

* * * * *